United States Patent
Kato

(10) Patent No.: US 8,749,823 B2
(45) Date of Patent: Jun. 10, 2014

(54) IMAGE FORMING APPARATUS THAT COMMUNICATES WITH A PORTABLE TERMINAL DEVICE, AND INFORMATION PROCESSING SYSTEM

(75) Inventor: Yoshinaga Kato, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 370 days.

(21) Appl. No.: 13/148,067

(22) PCT Filed: Mar. 16, 2010

(86) PCT No.: PCT/JP2010/054905
§ 371 (c)(1),
(2), (4) Date: Aug. 5, 2011

(87) PCT Pub. No.: WO2010/107125
PCT Pub. Date: Sep. 23, 2010

(65) Prior Publication Data
US 2011/0292445 A1    Dec. 1, 2011

(30) Foreign Application Priority Data
Mar. 18, 2009  (JP) ................................. 2009-067135
Nov. 19, 2009  (JP) ................................. 2009-264069

(51) Int. Cl.
G06F 3/12    (2006.01)
(52) U.S. Cl.
USPC ....... 358/1.15; 358/1.14; 358/1.16; 455/41.1; 455/41.2
(58) Field of Classification Search
USPC .............. 358/1.15, 1.14, 1.16; 455/41.1, 41.2
See application file for complete search history.

(56) References Cited

U.S. PATENT DOCUMENTS

2008/0304088 A1 * 12/2008 Tomihisa ........................ 358/1.9
2008/0316516 A1    12/2008 Kajikawa
(Continued)

FOREIGN PATENT DOCUMENTS

JP    2001 43058    2/2001
JP    2004 260341    9/2004
(Continued)

OTHER PUBLICATIONS

The Extended European Search Report issued Mar. 7, 2013, in Application No. / Patent No. 10753615.3-1959 / 2409483 PCT/JP2010054905.

(Continued)

Primary Examiner — Jacky X Zheng
(74) Attorney, Agent, or Firm — Oblon, Spivak, McClelland, Maier & Neustadt, L.L.P.

(57) ABSTRACT

An image processing apparatus includes a near field communication (NFC) unit that establishes, when a portable terminal device comes near the NFC unit, wireless communication with the portable terminal device; a short-range communication unit that has a larger wireless communication coverage than that of the NFC unit, establishes, after the wireless communication has been established and connection setting information has been received via the NFC unit, wireless communication with the portable terminal device by using the connection setting information; a data processing unit that performs data processing on data received via the short-range communication unit; a printer unit that prints out the processed data; and a control unit that controls, when the data received via the short-range communication unit is determined to contain data about image processing control, processing performed by the data processing unit or the printer unit in accordance with the data about image processing control.

10 Claims, 20 Drawing Sheets

(56) References Cited

U.S. PATENT DOCUMENTS

| | | |
|---|---|---|
| 2009/0033972 A1 | 2/2009 | Kato |
| 2009/0036056 A1* | 2/2009 | Oshima et al. ............... 455/41.3 |
| 2009/0066998 A1 | 3/2009 | Kato |

FOREIGN PATENT DOCUMENTS

| | | |
|---|---|---|
| JP | 2005 142918 | 6/2005 |
| JP | 2009 27691 | 2/2009 |
| JP | 2009 37566 | 2/2009 |
| JP | 2010 98717 | 4/2010 |

OTHER PUBLICATIONS

International Search Report Issued Jun. 29, 2010 in PCT/JP10/054905 filed Mar. 16, 2010.

* cited by examiner

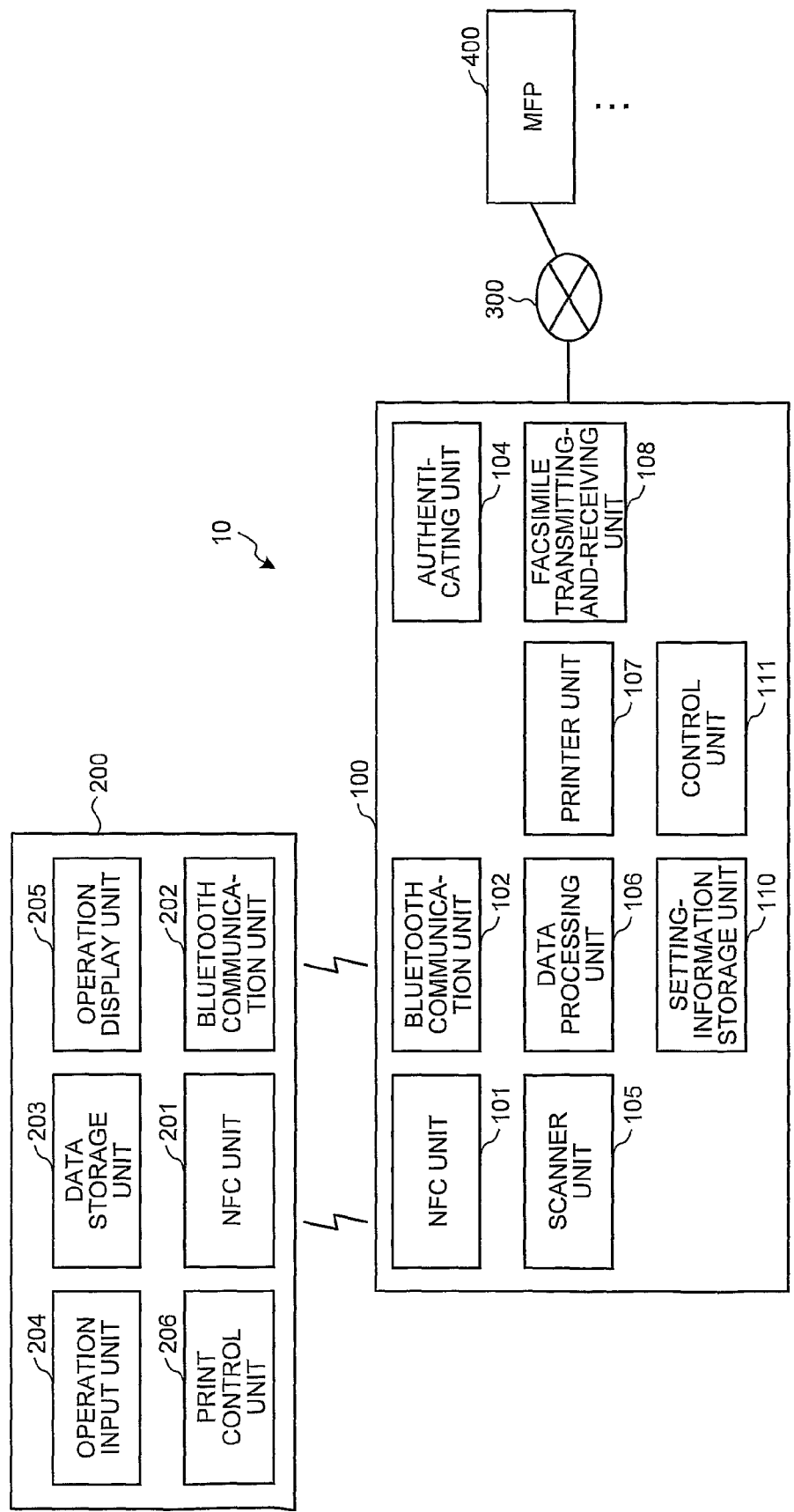

FIG.4

```xml
<?xml version="1.0" encoding="UTF-8"?>
<requestPrintStart>
    <fileName>C:\test.pdf</fileName>
    <condition>
        <mode>
            <func>Print</func>
            <propertyid>1</propertyid>
            <value>2</value>
        </mode>
        <mode>
            <func>Print</func>
            <propertyid>2</propertyid>
            <value>2</value>
        </mode>
        <mode>
            <func>Print</func>
            <propertyid>3</propertyid>
            <value>2</value>
        </mode>
        <mode>
            <func>Print</func>
            <propertyid>4</propertyid>
            <value>4</value>
        </mode>
        <mode>
            <func>Print</func>
            <propertyid>5</propertyid>
            <value>1</value>
        </mode>
        <mode>
            <func>Print</func>
            <propertyid>6</propertyid>
            <value>1</value>
        </mode>
    </condition>
</requestPrintStart>
```

FIG.5

| SETTING-ITEM NAME | FUNCTION NAME | SETTING-ITEM ID | SETTING-ITEM VALUE | AVAILABLE (APPLICABLE) OR UNAVAILABLE |
|---|---|---|---|---|
| NUMBER OF COPIES | PRINT | 1 | MIN: 1<br>MAX: 999 | 1: TRUE<br>0: FALSE |
| COLOR/ BLACK&WHITE | PRINT | 2 | 1: BLACK&WHITE<br>2: COLOR | 1: TRUE<br>0: FALSE |
| SELECTED SHEET FEED TRAY | PRINT | 3 | 1: AUTO PRINT SHEET TRAY<br>2: SHEET TRAY 1<br>3: SHEET TRAY 2<br>4: SHEET TRAY 3<br>5: SHEET TRAY 4<br>6: MANUAL FEED TRAY | 1: TRUE<br>0: FALSE |
| PRINT SHEET SIZE | PRINT | 4 | 1: A3 LANDSCAPE<br>2: A4 LANDSCAPE<br>3: A4 PORTRAIT<br>4: A5 LANDSCAPE<br>5: A5 PORTRAIT<br>6: A6 LANDSCAPE<br>7: B4 LANDSCAPE<br>8: B5 LANDSCAPE<br>9: B5 PORTRAIT<br>10: B6 LANDSCAPE | 1: TRUE<br>0: FALSE |
| SHEET TYPE | PRINT | 5 | 1: ORDINARY PAPER<br>2: RECYCLED PAPER<br>3: THICK PAPER<br>4: THIN PAPER<br>5: AUTO SELECTION | 1: TRUE<br>0: FALSE |
| DUPLEX | PRINT | 6 | 1: DUPLEX PRINTING: OFF<br>2: LEFT-SIDE STAPLING<br>3: RIGHT-SIDE STAPLING<br>4: TOP-SIDE STAPLING | 1: TRUE<br>0: FALSE |
| SORT | PRINT | 7 | 1: OFF<br>2: ON | 1: TRUE<br>0: FALSE |
| STAPLE | PRINT | 8 | 1: OFF<br>2: LEFT TOP 1<br>3: TOP RIGHT 1<br>4: MIDDLE 2<br>5: LEFT 2<br>6: TOP 2<br>7: RIGHT 2 | 1: TRUE<br>0: FALSE |
| PUNCH HOLE | PRINT | 9 | 1: OFF<br>2: LEFT 2<br>3: TOP 2<br>4: RIGHT 2 | 1: TRUE<br>0: FALSE |
| COMBINE | PRINT | 10 | 1: OFF<br>2: 2 PAGES IN LATERAL ARRANGEMENT (LEFT→RIGHT)<br>3: 2 PAGES IN LATERAL ARRANGEMENT (RIGHT→LEFT)<br>4: 2 PAGES IN VERTICAL ARRANGEMENT (TOP→BOTTOM)<br>5: 4 PAGES ARRANGED IN 2-BY-2 MATRIX (TOP LEFT→TOP RIGHT→BOTTOM LEFT→BOTTOM RIGHT)<br>6: 4 PAGES ARRANGED IN 2-BY-2 MATRIX (TOP RIGHT→TOP LEFT→BOTTOM RIGHT→BOTTOM LEFT)<br>7: 4 PAGES ARRANGED IN 2-BY-2 MATRIX (TOP LEFT→BOTTOM LEFT→TOP RIGHT→BOTTOM RIGHT)<br>8: 4 PAGES ARRANGED IN 2-BY-2 MATRIX (TOP RIGHT→BOTTOM RIGHT→TOP LEFT→BOTTOM LEFT) | 1: TRUE<br>0: FALSE |
| OUTPUT TRAY | PRINT | 11 | 1: MFP TRAY<br>2: FINISHER UPPER BIN<br>3: FINISHER LOWER BIN | 1: TRUE<br>0: FALSE |
| RESOLUTION | PRINT | 12 | 1: 400<br>2: 600 | 1: TRUE<br>0: FALSE |
| COPYING DETECTION ENABLED/ DISABLED | PRINT | 13 | 1: ENABLED<br>2: DISABLED | 1: TRUE<br>0: FALSE |

FIG.10

```xml
<?xml version="1.0" encoding="UTF-8"?>
<requestConditionResult>
    <condition>
        <mode>
            <func>Print</func>
            <propertyid>2</propertyid>
            <value>1</value>
            <state>TRUE</state>
        </mode>
        <mode>
            <func>Print</func>
            <propertyid>2</propertyid>
            <value>2</value>
            <state>FALSE</state>
        </mode>

<mode>
            <func>Print</func>
            <propertyid>4</propertyid>
            <value>1</value>
            <state>FALSE</state>
        </mode>
        <mode>
            <func>Print</func>
            <propertyid>4</propertyid>
            <value>2</value>
            <state>TRUE</state>
        </mode>
        <mode>
            <func>Print</func>
            <propertyid>4</propertyid>
            <value>3</value>
            <state>TRUE</state>
        </mode>
        <mode>
            <func>Print</func>
            <propertyid>4</propertyid>
            <value>4</value>
            <state>TRUE</state>
        </mode>
        <mode>
            <func>Print</func>
            <propertyid>4</propertyid>
            <value>5</value>
            <state>TRUE</state>
        </mode>
        <mode>
            <func>Print</func>
            <propertyid>4</propertyid>
            <value>6</value>
            <state>FALSE</state>
        </mode>
        <mode>
            <func>Print</func>
            <propertyid>4</propertyid>
            <value>7</value>
            <state>FALSE</state>
        </mode>
        <mode>
            <func>Print</func>
            <propertyid>4</propertyid>
            <value>8</value>
            <state>FALSE</state>
        </mode>
        <mode>
            <func>Print</func>
            <propertyid>4</propertyid>
            <value>9</value>
            <state>FALSE</state>
        </mode>
        <mode>
            <func>Print</func>
            <propertyid>4</propertyid>
            <value>10</value>
            <state>FALSE</state>
        </mode>
        ....
    </condition>
</requestConditionResult>
```

FIG.18

| INFORMATION ABOUT MODEL | SETTINGS |
|---|---|
| imagio Neo C 455 | A4/ONE-SIDED/FULL-COLOR/ LANDSCAPE/2 COPIES ··· |
| imagio Neo C 455it | A5/DUPLEX/FULL-COLOR/ PORTRAIT/1 COPY ··· |
| IPSiO CX SP C810 | B5/ONE-SIDED/FULL-COLOR/ LANDSCAPE/2 COPIES ··· |
| IPSiO CX 2500 | A4/ONE-SIDED/MONOCHROME/ LANDSCAPE/1 COPY ··· | ize
IMAGE FORMING APPARATUS THAT COMMUNICATES WITH A PORTABLE TERMINAL DEVICE, AND INFORMATION PROCESSING SYSTEM

TECHNICAL FIELD

The present invention relates generally to an image forming apparatus and an information processing system.

BACKGROUND ART

Recent compact configurations of information technology devices have allowed users to carry an information technology device. Environment in which information technology devices can be connected with each other from anywhere to anywhere is becoming reality.

On the negative side, occurrence of information leakage via an information technology device taken out of a company, which is disadvantageous, is becoming pronounced. Accordingly, companies are placing importance on establishing a management system for securing and maintaining information security.

For instance, an image forming apparatus that controls image output by determining whether to allow image data received from a terminal device to be output based on data added to the image data, thereby protecting data security on a network is disclosed in Japanese Patent Application Laid-open No. 2001-043058.

However, the technique described in Japanese Patent Application Laid-open No. 2001-043058 is disadvantageous in that it requires a user who handles the image data with the terminal device to add in advance the data for use in image output control to the image data as required, which places a burden on the user.

The present invention has been made in view of the above circumstances and provides an image forming apparatus that controls contents and output of image data without involving operation performed by a user to thereby prevent information leakage without placing a burden on the user or an administrator and an information processing system.

DISCLOSURE OF INVENTION

According to an aspect of the present invention, there is provided an image processing apparatus that includes a near field communication (NFC) unit that establishes, when a portable terminal device comes near the NFC unit, wireless communication with the portable terminal device; a short-range communication unit that has a larger wireless communication coverage than a wireless communication coverage of the NFC unit, establishes, after the wireless communication has been established and connection setting information has been received via the NFC unit, wireless communication with the portable terminal device by using the connection setting information; a data processing unit that performs data processing on data received via the short-range communication unit; a printer unit that prints out the processed data; and a control unit that controls, when the data received via the short-range communication unit is determined to contain data about image processing control, processing performed by at least one of the data processing unit and the printer unit in accordance with the data about image processing control.

According to another aspect of the present invention, there is provided an information processing system that includes a portable terminal device and an image forming apparatus. The information device includes a location-information acquiring unit that acquires physical location information about the portable terminal device; a first near field communication (NFC) unit that establishes wireless communication with another device by being brought near the other device; a first short-range communication unit that has a larger wireless communication coverage than a wireless communication coverage of the first NFC unit and establishes, after the wireless communication has been established and connection setting information has been received via the first NFC unit, wireless communication with the other device by using the connection setting information; and a print control unit that creates an instruction indicating whether to enable or disable print processing control based on the location information and causes the instruction to be contained in data to be transmitted via the first short-range communication unit. The image forming apparatus includes a second NFC unit that establishes, when the portable terminal device comes near the second NFC unit, wireless communication with the portable terminal device; a second short-range communication unit that has a larger wireless communication coverage than a wireless communication coverage of the second NFC unit, establishes, after the wireless communication has been established and connection setting information has been received via the second NFC unit, wireless communication with the portable terminal device by using the connection setting information; a data processing unit that receives the data transmitted from the portable terminal device via the second short-range communication unit, performs data processing on the data; a printer unit that prints out the processed data; and a control unit that controls processing performed by at least one of the data processing unit and the printer unit in accordance with the instruction indicating whether to enable or disable print processing control contained in the data received via the second short-range communication unit.

BRIEF DESCRIPTION OF DRAWINGS

FIG. 3 is a block diagram illustrating the configuration of the information processing system;

FIG. 4 is a schematic diagram illustrating an example of print-start control data;

FIG. 5 is a schematic diagram illustrating an example list of values to be placed in tags;

FIG. 10 is a schematic diagram illustrating an example of function setting information;

FIG. 18 is an explanatory diagram illustrating an example of a data structure of a data storage unit;

BEST MODE(S) FOR CARRYING OUT THE INVENTION

Exemplary embodiments of an image forming apparatus and an information processing system according to the present invention will be described in detail below with reference to the accompanying drawings.

The embodiments are applied to what is called an MFP, which is an example of an image processing apparatus (image forming apparatus), that includes a copying function, a facsimile (FAX) function, a printing function, a scanner function, and a function of distributing input image data (image data scanned in by using the scanner function, image data acquired by using the printing function, and image data received by using the FAX function). The embodiments will be discussed by way of example where the information processing apparatus is implemented as the MFP; however, the information processing apparatus is not limited to the MFP and can be implemented as any information processing apparatus, such as a printer apparatus that includes only a printing function, a scanner apparatus that includes only the scanner function, or an image forming apparatus that includes at least one of the functions discussed above.

Figure 1:
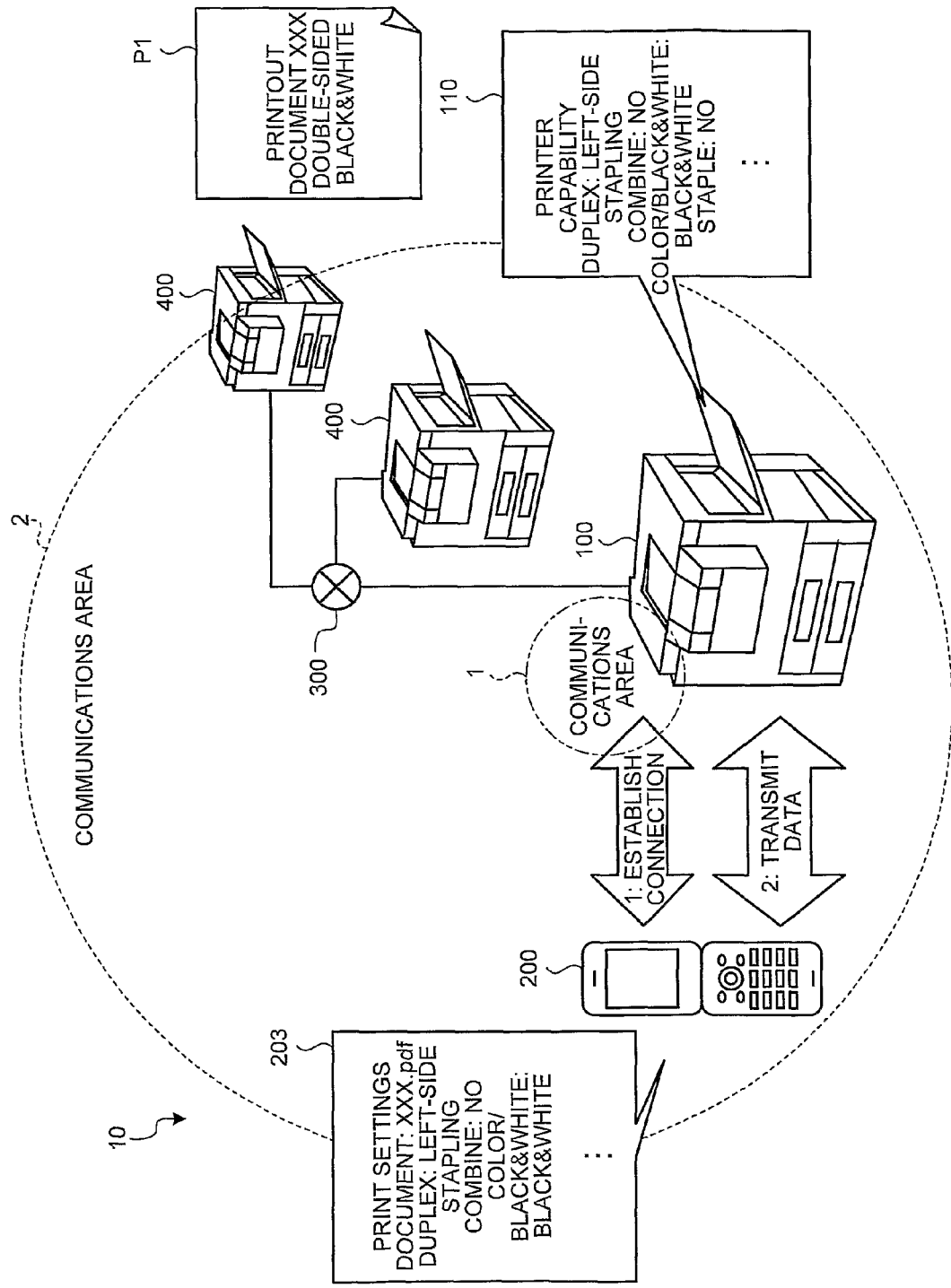
FIG. 1 is a schematic diagram illustrating the configuration of an information processing system according to an embodiment of the present invention.

An example configuration of an information processing system that includes an MFP and a portable terminal device, to which the present invention is applied, will be explained below. FIG. 1 is a schematic diagram illustrating the configuration of an information processing system according to an embodiment of the present invention. An information processing system 10 according to the present embodiment includes an MFP 100 and a portable terminal device 200. The portable terminal device 200 is a small computer, such as a cellular phone, a notebook personal computer (PC), or a personal digital assistant (PDA), that includes a radio communication function. As is known in the art, the MFP 100 is an apparatus that has functions of processing data to be printed and printing out the data on a medium (e.g., paper).

The MFP 100 can be set to various settings related to data processing. Examples of the settings include settings about whether to perform duplex printing (e.g., whether to perform printing on one side of a medium or to perform duplex printing in an orientation for left-side stapling), whether to perform combine printing (e.g., whether to transfer an image of one page to a medium of one page without scaling or to transfer images of two pages onto a medium of one page by reducing the images of the two pages), whether to perform color printing (color printing or white-and-black printing), and whether to perform stapling (e.g., whether to perform no stapling or to perform stapling at, e.g., a top left-hand corner).

The MFP 100 and the portable terminal device 200 can communicate with each other by using two communications units, as will be described later, in a communication area 1 indicated by a dashed double-dotted line and a communication area 2 indicated by a dotted line. The MFP 100 is connected to a network 300, via which the MFP 100 is connected to another MFP 400, a facsimile apparatus, a client terminal device, and the like. FIG. 1 illustrate an example where a user can configure print settings of the MFP 100 for printing document data "XXX.pdf" from the portable terminal device 200 such that "left-side stapling" is set for "duplex" printing, "off" is set for "combine," "black&white" is set for "color/black&white" printing while the MFP 100 has printer functional capability of setting "left-side stapling" for "duplex" printing, "off" for "combine," "black&white" for "color/black&white" printing, and the like. FIG. 1 also illustrates that, performing a print process, which will be described later, on document data P1 illustrated in FIG. 1, produces a double-sided printout, on which the document data P1 is printed in black and white without being combined.

Figure 2:
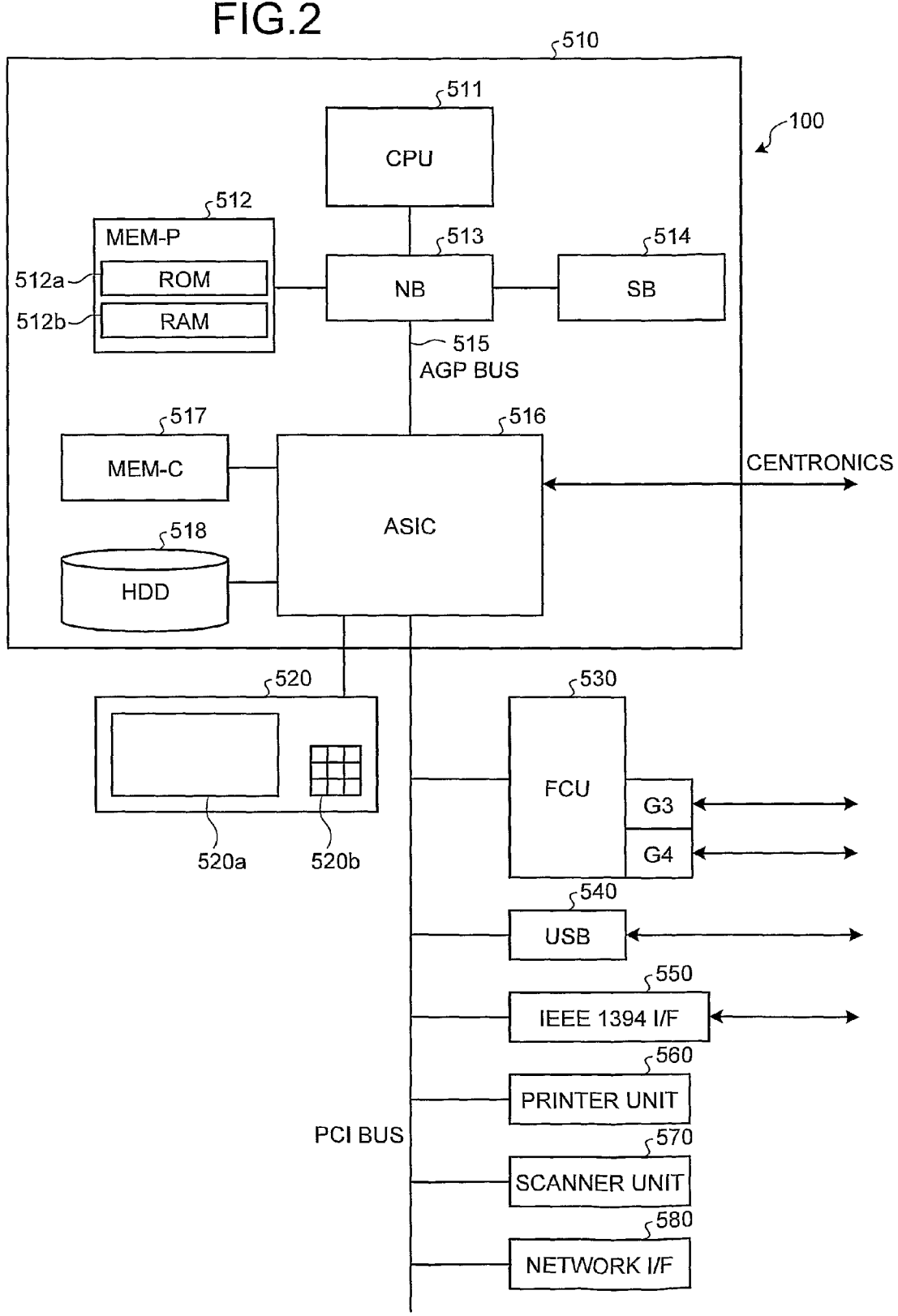
FIG. 2 is an explanatory diagram illustrating a hardware configuration of a multifunction peripheral (MFP)

Hardware configuration of the MFP 100 will be described below. FIG. 2 is an explanatory diagram illustrating a hardware configuration of the MFP 100. As illustrated in FIG. 2, the MFP 100 includes a controller 510, a printer unit 560, and a scanner unit 570 that are connected via a peripheral component interconnect (PCI) bus. The controller 510 is a controller that controls the overall MFP 100, picture processing, communications, and inputs entered from an operating unit 520. The printer unit 560 or the scanner unit 570 includes an image processing section that performs error diffusion, gamma conversion, and the like. The operating unit 520 includes a control display unit 520*a* that displays document image information about a document scanned in by the scanner unit 570 and the like on a liquid crystal display (LCD) and receives a control input entered by an operator from a touch panel, and a keyboard unit 520*b* that receives a key entry entered by the operator.

The digital MFP 100 according to the present embodiment allows switching from one of a document box function, the copying function, the printer function, and a facsimile function to another by using an application selection key provided on the operation unit 520. When the document box function is selected, the MFP 100 enters a document box mode; when the document box function is selected, the MFP 100 enters a copy mode; and when a facsimile function mode is selected, the MFP 100 enters the facsimile mode.

The controller 510 includes a central processing unit (CPU) 511, which is a principal section of a computer, a system memory (hereinafter, "MEM-P") 512, a north bridge (NB) 513, a south bridge (SB) 514, an application-specific integrated circuit (ASIC) 516 that is connected to the NB 513 via an accelerated graphics port (AGP) bus 515, a local memory (hereinafter, "MEM-C") 517, which is a storage unit, and a hard disk drive (HDD) 518, which is a storage unit. The MEM-P 512 further includes a read only memory (ROM) 512*a* and a random access memory (RAM) 512*b*.

The CPU 511 that controls the overall digital MFP 100 includes a chip set that includes the NB 513, the MEM-P 512, and the SB 514, and is connected to other devices via the chip set.

The NB 513 is a bridge for connecting the CPU 511 to the MEM-P 512, the SB 514, and the AGP bus 515, and includes a PCI master, an AGP target, and a memory controller that controls reading and writing from and to the MEM-P 512 and the like.

The MEM-P 512 is a system memory for use as a memory for storing therein computer programs and data, a memory for expanding computer programs and data therein, as a memory for use in picture processing performed by the printer, and the like, and includes the ROM 512a and the RAM 512b. The ROM 512a is a read only memory for use as a memory for storing therein computer programs and data. The RAM 512b is a writable and readable memory for use as a memory for expanding computer programs and data therein, as a memory for use in picture processing performed by the printer, and the like.

The SB 514 is a bridge for connecting the NB 513 to PCI devices and to peripheral devices. The SB 514 is connected to the NB 513 via the PCI bus, to which a network interface (I/F) unit 580 and the like are also connected.

The ASIC 516 is an integrated circuit (IC) for use in image processing, includes a hardware component for the image processing, and functions as a bridge that connects the AGP bus 515, the PCI bus, the HDD 518, and the MEM-C 517 to each other. The ASIC 516 includes a PCI target and an AGP master, an arbiter (ARB) serving as the core for the ASIC 516, a memory controller that controls the MEM-C 517, a plurality of direct memory access controllers (DMACs) that control rotation of image data and the like by hardware logic, and a PCI unit that performs data transfer to and from the printer unit 560 and the scanner unit 570 via the PCI bus. A facsimile control unit (FCU) 530, a universal serial bus (USB) 540, and an IEEE 1394 (the Institute of Electrical and Electronics Engineers 1394) interface 550 are connected to the ASIC 516 via the PCI bus.

The MEM-C 517 is a local memory for use as a copy image buffer and a code buffer. The HDD 518 is a storage for storing therein image data, font data, forms, and computer program that controls operation of the CPU 511.

The AGP bus 515 is a bus interface for a graphics accelerator card introduced to speed up graphics operations and allows direct access to the MEM-P 512 with a high throughput, thereby speeding up operations related to the graphic accelerator card.

Computer program to be executed by the MFP 100 according to the present embodiment is preferably installed on a ROM or the like in advance. A configuration, in which the computer program to be executed by the MFP 100 according to the present embodiment is recorded in a computer-readable recording medium, such as a compact disc-read-only memory (CD-ROM), a flexible disk (FD), a CD recordable (CD-R), or a digital versatile disk (DVD), in an installable or executable format, can be employed.

Another configuration in which, the computer program to be executed by the MFP 100 according to the present embodiment is stored in a computer connected to a network such as the Internet so that the computer program can be downloaded via the network, can be employed. Still another configuration, in which the computer program to be executed by the MFP 100 according to the present embodiment is provided or distributed via a network such as the Internet, can be employed.

The computer program to be executed by the MFP 100 according to the present embodiment has a module configuration that includes units (a near field communication (NFC) unit 101, a Bluetooth (trademark) communication unit 102, an authenticating unit 104, a data processing unit 106, a facsimile transmitting-and-receiving unit 108, a control unit 111, and the like (see FIG. 3)), which will to be described later. From the viewpoint of actual hardware, the CPU (processor) reads the computer program from the ROM and executes the computer program to load the units on a main memory device, whereby the NFC unit 101, the Bluetooth communication unit 102, the authenticating unit 104, the data processing unit 106, the facsimile transmitting-and-receiving unit 108, the control unit 111, and the like are generated on the main memory device.

FIG. 3 is a block diagram illustrating the configuration of the information processing system 10 according to the present embodiment. The MFP 100 includes the NFC unit 101, the Bluetooth communication unit 102, the authenticating unit 104, a scanner unit 105, the data processing unit 106, a printer unit 107, the facsimile transmitting-and-receiving unit 108, a setting-information storage unit 110, and the control unit 111.

The control unit 111 controls each of the NFC unit 101, the Bluetooth communication unit 102, the authenticating unit 104, the scanner unit 105, the data processing unit 106, the printer unit 107, the facsimile transmitting-and-receiving unit 108, and the setting-information storage unit 110.

The NFC unit 101 carries out contactless communication with the portable terminal device 200 in compliance with a near field communication (NFC), which is a standard for contactless IC radio communication. Specifically, the NFC unit 101 is a reader/writer, on which communication-control computer program for reading information from a tag of an NFC unit 201 of the portable terminal device to be described later in a contactless manner is installed. The NFC unit 101 transmits and receives data by carrying out communication at shorter distance than that of the Bluetooth communication unit 102, which is another communication unit, or, specifically, contactless communication at a communication distance of about 0 to ten-odd millimeters. Because data transfer rate (100 kilobits per second (kbps) to 400 kbps) of the contactless communication carried out via the NFC unit 101 in compliance with the NFC standard is slower than data transfer rate (1 megabits per second (Mbps) to 2 Mbps) of wireless communication carried out via the Bluetooth communication unit 102 in compliance with the Bluetooth standard, the contactless communication technology in compliance with the NFC standard is typically used in transmitting data of a relatively small amount. The communication standard adopted by the NFC unit 101 is not necessarily the NFC standard, and the NFC unit 101 can adopt any other standard as communication standard that allows relatively-short-distance wireless communication, or, specifically, wireless communication at a communication area shorter than that of wireless communication in compliance with the Bluetooth standard, which will be described later.

When the portable terminal device 200 comes near and enters a coverage of the NFC unit 101, the NFC unit 101 establishes communication with the NFC communication unit 201 of the portable terminal device 200 and receives an authentication identification (ID), a function ID, connection setting information, and function setting information transmitted from the portable terminal device 200. The authentication ID is information (authentication information) for use in determining whether to permit use of the MFP 100 under instruction of the portable terminal device 200. The authentication ID can be unique information allocated to the portable terminal device 200, or information for identifying an owner of the portable terminal device 200. As the information for identifying a user, an employee ID or the like information can be used. The function ID is information (function information) that indicates what function of the MFP 100 is requested by the portable terminal device 200. For instance, when use of the printing function of the MFP 100 is being requested, a "print ID" is set as the function ID. When use of the scanner function of the MFP 100 is being requested, a "scanner ID" is set as the function ID.

The connection setting information is information for use in carrying out wireless communication via the Bluetooth communication unit 102. As mentioned above, the connection setting information for Bluetooth communication between the portable terminal device 200 and the MFP 100 is received by carrying out NFC communication, with which data can be transmitted and received relatively easily. Accordingly, a user can specify the MFP 100, with which Bluetooth communication is to be established, by only bringing the portable terminal device 200 near the MFP 100 rather than by performing special operation, which facilitates user convenience. The function setting information is setting information that indicates processing to be performed to implement the function. For instance, when the print ID is set as the function ID, the function setting information is configured such that a set value "on" or "off" is set for a setting ID "duplex printing," which belongs to print setting information, while a set value "on" or "off" is set for a setting ID "combine," which belongs to the print setting information. When the scan ID is set as the function ID, the function setting information is configured such that a set value "300" dots per second (dps) or the like is set for a setting ID "resolution," which belongs to scan setting information.

The function setting information contains status information and setting information about the MFP 100 and has items and values that belong to the items. Examples of the items that indicate status of the MFP 100 include connection of each tray, remaining amount of sheets on each tray, sheet size of each tray, connection of a staple unit, and connection of a hole-punch unit. Examples of the setting information include information about the number of copies, print color, a sheet feed tray, print sheet size, print sheet type, whether to perform duplex printing, whether to perform sorting, whether to perform stapling, whether to perform hole punching, combined printing, sheet output tray, resolution, and whether to perform printing with pattern embedded. The function setting information can be described in printer description language (PostScript (trademark), portable document format (PDF (trademark)), printer control language (PCL (trademark)), printer job language (PJL), or the like) of the MFP 100.

The authenticating unit 104 determines whether the function ID transmitted from the portable terminal device 200 is an ID, for which use of the MFP 100 is permitted.

The Bluetooth communication unit 102 communicates with the portable terminal device 200 in a contactless manner in compliance with the Bluetooth standard, which is short-range communication means. The Bluetooth communication unit 102 that employs the wireless communication technology of the Bluetooth standard transmits and receives data of a large amount and at a high data rate (1 Mbps to 2 Mbps) as compared to the NFC unit 101 that carries out contactless communication in compliance with the NFC standard. The Bluetooth communication unit 102 that employs the wireless communication technology of the Bluetooth standard allows devices to communicate with each other even when an obstruction is placed therebetween so long as the distance between the devices is equal to or smaller than ten meters; put another way, the Bluetooth communication unit 102 has a communication area that is longer than a communication area of a communication system in compliance with the NFC standard.

Specifically, the Bluetooth communication unit 102 includes a Bluetooth I/F, such as a transceiver in compliance with the Bluetooth standard for use in data transmission and reception, and a communication control unit. The Bluetooth I/F is for use in data transmission and reception to and from the portable terminal device 200. The communication control unit is communication-control computer program that exchanges, prior to data transmission and reception to and from the portable terminal device 200, connection setting information with the device, with which communication is to be carried out, via the Bluetooth I/F thereby establishing wireless communication in compliance with the Bluetooth standard. As the connection setting information, unique address information allocated to the Bluetooth I/F can be used.

In the present embodiment, wireless communication is carried out by using the Bluetooth communication unit 102 that complies with the Bluetooth standard; however, a standard in compliance with which wireless communication is to be carried out is not necessarily the Bluetooth standard. For instance, a configuration, in which wireless communication is carried out, with wireless fidelity (Wi-Fi (trademark)) technology in compliance with the IEEE 802.11a/IEEE 802.11b standards, can be employed. In this case, a Wi-Fi communication unit can be configured to include a network board that complies with the IEEE 802.11a/IEEE 802.11b standards and performs data transmission and reception, and a communication control unit (communication-control computer program) that controls establishment of wireless communication and data transmission and reception in compliance with the IEEE 802.11a/IEEE 802.11b standards. Alternatively, a configuration that allows, when devices are away from each other equal to or smaller than 3 meters, to carry out wireless communication in compliance with wireless USB standard at 480 Mbps, which is of approximately equal rate to that of wired USB 2.0, can be employed. In this case, a wireless USB communication unit can be configured to include a wireless-USB-compliant USB device and a communication control unit (communication-control computer program) that controls establishment of wireless communication and data transmission and reception by using UWB technology.

If the connection setting information has been received by using the NFC communication and the Bluetooth communication has been established based on the thus-received connection setting information, the Bluetooth communication unit 102 transmits and receives data according to the function ID. The data to be transmitted and received can be any one of various types of data, such as image data, document data, text data, and other data.

The scanner unit 105 scans in a document by using an imaging device, such as a charge coupled device (CCD). The scanner unit 105 can include an auto document feeder (ADF) to automatically feed a document.

The data processing unit 106 performs processing on data received via the Bluetooth communication unit 102 or data to be transmitted via the Bluetooth communication unit 102 according to a function ID and function settings received via the NFC unit 101. For instance, when the "print ID" is set as the function ID, the data processing unit 106 performs image processing, such as density and/or color adjustment, layout processing, such as a one-sided/duplex printing, and/or the like on data according to the function setting information. When the "scanner ID" is set as the function ID, the data processing unit 106 performs, on the data read from the scanner unit 105, image processing and layout processing according to the function settings.

The printer unit 107 prints the data having undergone the image processing, the layout processing, and the like performed by the data processing unit 106.

The facsimile transmitting-and-receiving unit 108 transmits data scanned in by the scanner unit 105 or data transmitted from the portable terminal device 200 to the other MFP 400, the facsimile apparatus, the client terminal, and/or the like via the network 300. The facsimile transmitting-and-receiving unit 108 also receives data transmitted from the other MFP 400, the facsimile apparatus, and/or the client terminal.

The setting-information storage unit 110 stores therein the function setting information that relates the functions provided by the MFP 100 with function names, property-item IDs, and property-item values as illustrated in FIG. 5. FIG. 5 illustrates an example where the setting-information storage unit 110 stores therein set values from "1" (duplex printing: off) to "4" (top-side stapling) as settings for duplex printing. With an MFP that does not have a duplex printing function, the setting-information storage unit 110 can store therein only "1" (duplex printing: off) as setting for duplex printing. Similarly, with an MFP that does not have a color printing function, the setting-information storage unit 110 can store therein only "1" (black&white) as setting for color/black&white. Because the MFP 100 generally provides different functions depending on a model of the MFP 100 as discussed above, the setting-information storage unit 110 preferably stores therein setting-item IDs and at least one available value for each of the setting-item IDs on a function-by-function basis.

The portable terminal device 200 will be described below. The portable terminal device 200 has the configuration of a computer and includes a CPU (processor), a ROM, and a RAM. Computer program to be executed by the portable terminal device 200 can be installed in the ROM or the like in advance. A configuration, in which the computer program to be executed by the portable terminal device 200 is recorded in a computer-readable recording medium in an installable or executable format, can be employed.

Another configuration, in which the computer program to be executed by the portable terminal device 200 is stored in a computer connected to a network such as the Internet so as to be downloaded via the network, can be employed. Still another configuration, in which the program executed by the portable terminal device 200 is provided or distributed via a network such as the Internet, can be employed.

The computer program to be executed by the portable terminal device 200 has a module configuration that includes units (the NFC communication unit 201, a Bluetooth communication unit 202, a print control unit 206, and the like (FIG. 3)), which will be described later. From the viewpoint of actual hardware, the CPU reads the computer program from the ROM and executes the computer program to load the units on a main memory device, whereby the NFC communication unit 201, the Bluetooth communication unit 202, the print control unit 206, and the like are generated on the main memory device. Specific examples of the portable terminal device 200 include a cellular phone, a PDA, a notebook PC, and a portable storage medium.

As illustrated in FIG. 3, the portable terminal device 200 includes the NFC communication unit 201, the Bluetooth communication unit 202, a data storage unit 203, an operation input unit 204, an operation display unit 205, and the print control unit 206.

When the portable terminal device 200 comes near and enters the coverage of the NFC unit 101 of the MFP 100, the NFC communication unit 201 establishes communication with the NFC unit 101 of the MFP 100 and transmits an authentication ID and a function ID for use in utilization of the MFP 100 from the portable terminal device 200, the connection setting information for use in establishing communication via the Bluetooth communication unit 202, and the function setting information to the MFP 100.

Specifically, the NFC communication unit 201 is an NFC chip that includes a tag, in which the authentication ID and the function ID are stored, and communication-control computer program that controls the communication establishment and data transmission and reception. The NFC communication unit 201 is configured such that when the NFC communication unit 201 comes near the MFP 100, communication is established and the NFC communication unit (reader/writer) 101 of the MFP 100 reads and transmits information from the tag.

Another configuration, in which the NFC chip that includes the tag and the communication-control computer program is stored in a contactless IC card and the authentication ID and the function ID are transmitted to the MFP 100 independently of a body of the portable terminal device 200, can be employed.

In the present embodiment, the NFC communication unit 201 of the portable terminal device 200 is configured to include the tag that stores therein the authentication ID and the function ID while the NFC unit 101 of the MFP 100 is configured as the reader/writer; however, the configuration is not limited thereto. Another configuration, in which the NFC communication unit 201 of the portable terminal device 200 is a reader/writer and the NFC unit 101 of the MFP 100 is a tag, can be employed. More specifically, the configuration can be constructed such that the authentication ID and the function ID are stored in the data storage unit 203 of the portable terminal device 200 in advance; when communication is established by bringing the NFC communication unit 201 near the MFP 100, a control unit (not shown) causes the authentication ID and the function ID to be transferred from the data storage unit 203 to the NFC communication unit 201; and the reader/writer of the NFC communication unit 201 transmits and writes the thus-transferred authentication ID and the function ID to and on the NFC communication unit (tag) 101 of the MFP 100.

When communication with the Bluetooth communication unit 102 of the MFP 100 has been established, the Bluetooth communication unit 202 transmits data stored in the data storage unit 203 to the MFP 100. The Bluetooth communication unit 202 also receives data processed by utilizing function of the MFP 100.

The data storage unit 203 stores therein data for use in utilizing the function of the MFP 100. For instance, the data storage unit 203 stores therein connection setting information, print setting information serving as function setting information, and image data for use in utilizing the print function of the MFP 100. The function setting information can be stored in such a data format as illustrated in FIG. 5, for instance. The setting-item ID is an ID number that specifies what is to be performed with the function. Examples of the setting-item ID for the print function include "6" corresponding to "duplex printing." Each of the setting-item values is a value selected among candidate values available for a corresponding setting-item ID and specifies an operation to be performed on data. For instance, "2" (left-side stapling) can be set as the setting-item value for the setting-item ID "6," which corresponds to duplex printing.

The operation input unit 204 includes an operating button, such as a push button, and receives inputs of a function ID, a setting-item ID, and a setting-item value from a user. For instance, a user can press (click) the operation input unit 204 to thereby select and specify a setting-item value for use in utilizing the MFP 100 among setting-item values stored in the data storage unit 203. The thus-received control data for use in utilizing the MFP 100 is stored in the data storage unit 203 and simultaneously transmitted to the print control unit 206. The control data will be described in detail later.

The print control unit 206 transmits the control data to the MFP 100 via the Bluetooth communication unit 202. The MFP 100 performs processing, such as print start, print disconnection, generation of print data, acquisition of setting information, acquisition of print status, and the like related to the MFP 100 according to the control data. The print control unit 206 also transmits response data or setting information to respond to the control data transmitted from the MFP 100 to the operation display unit 205.

FIG. 4 is a schematic diagram illustrating an example of print-start control data. In the example given in FIG. 4, the print-start control data that includes function setting information is described in eXtensible Markup Language (XML).

A request for print start can be made by using <requestPrintStart> tags. Specifically, print setting information and a file name of print data are placed in <requestPrintStart> tags in a nested manner. More specifically, the file name is placed in <fileName> tags and the setting information is placed in <mode> tags. The mode tags further contains <func> tags, <propertyid> tags, and <value> tags, in which a function, a setting-item ID, and a setting-item value, respectively, are to be placed. FIG. 5 illustrates an example of a list of values to be placed in the tags. In this example, the <func> tags are used to define a function name of data processing, such as print and scan; and <Print> is a function name of printing performed by using a printer from the portable terminal.

The <propertyid> tags are used to define an ID number of a corresponding setting item. In the example given in FIG. 5, numbers 1, 2, . . . are assigned in advance to the number of copies, color/black&white, . . . , respectively, which are the setting-item names. The <value> tags are used to define setting-item values, which are set values corresponding to the number of copies and color/black&white, by numerical value. In this example, 1 and 2 are assigned to black&white and color, respectively, as setting-item values for print color in advance. Accordingly, for a portion in the example given in FIG. 4 where <puropetyid> is defined as 2 and <value> is defined as 2, the value corresponding to color is set as the setting-item value for color/black&white.

The example described in XML has been discussed above; however, any structured document can be employed irrespective of its format. For instance, the control data can be described in hypertext markup language (HTML). In the example described in XML, keywords, such as the setting-item, are described by using tags; however, the control data can be described in a not-structured format, such as a plain text, so long as the format allows to define keywords for use in control uniquely and extract a value assigned to each keyword.

The operation display unit 205 includes a screen, such as a liquid crystal display (LCD), and displays the connection setting information and the function setting information stored in the data storage unit 203. For instance, the operation display unit 205 can display a setting-item name and values that are related to a corresponding setting-item ID and stored in the data storage unit 203 to prompt a user to press (click) the operation input unit 204 to make selection among the displayed values related to the setting-item name.

Figure 6:
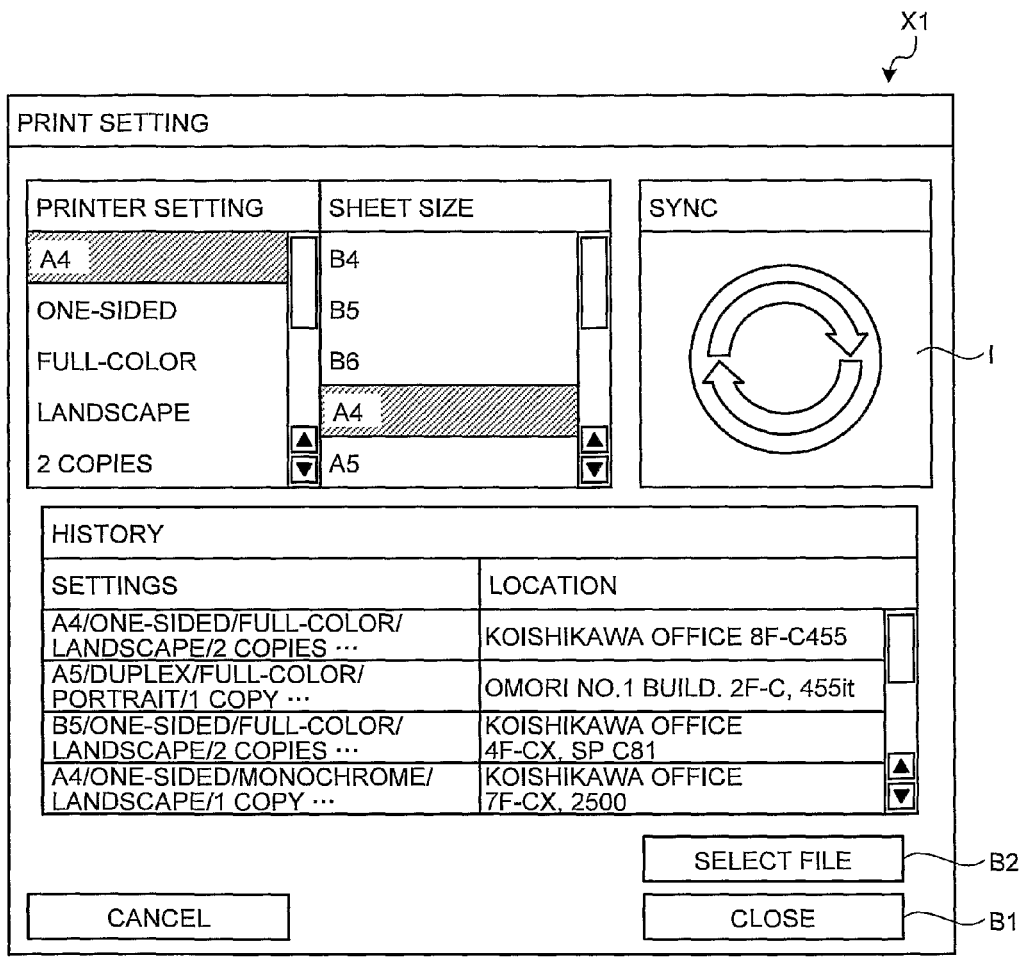
FIG. 6 is a schematic explanatory diagram illustrating an example of a window to be displayed on a control display unit.

FIG. 6 is a schematic explanatory diagram illustrating an example of a window to be displayed on the operation display unit 205. The window illustrated in FIG. 6 is a print setting window X1. As illustrated in an upper section of FIG. 6, the print setting window X1 includes a synchronization (hereinafter, "sync") icon I and two vertical lists for use in selecting settings. In the example illustrated in FIG. 6, current set values for the setting-item names are displayed in a "printer setting" list while, in the other list on the right, a setting-item name selected on the operation display unit 205 and setting-item values are displayed. As illustrated in FIG. 6, selecting "A4" from the "printer setting" list causes "sheet size," which is a corresponding setting-item name, and setting-item values for "sheet size" are displayed on the list on the right. The setting-item value currently selected on the operation display unit 205 is highlighted.

Figure 7:
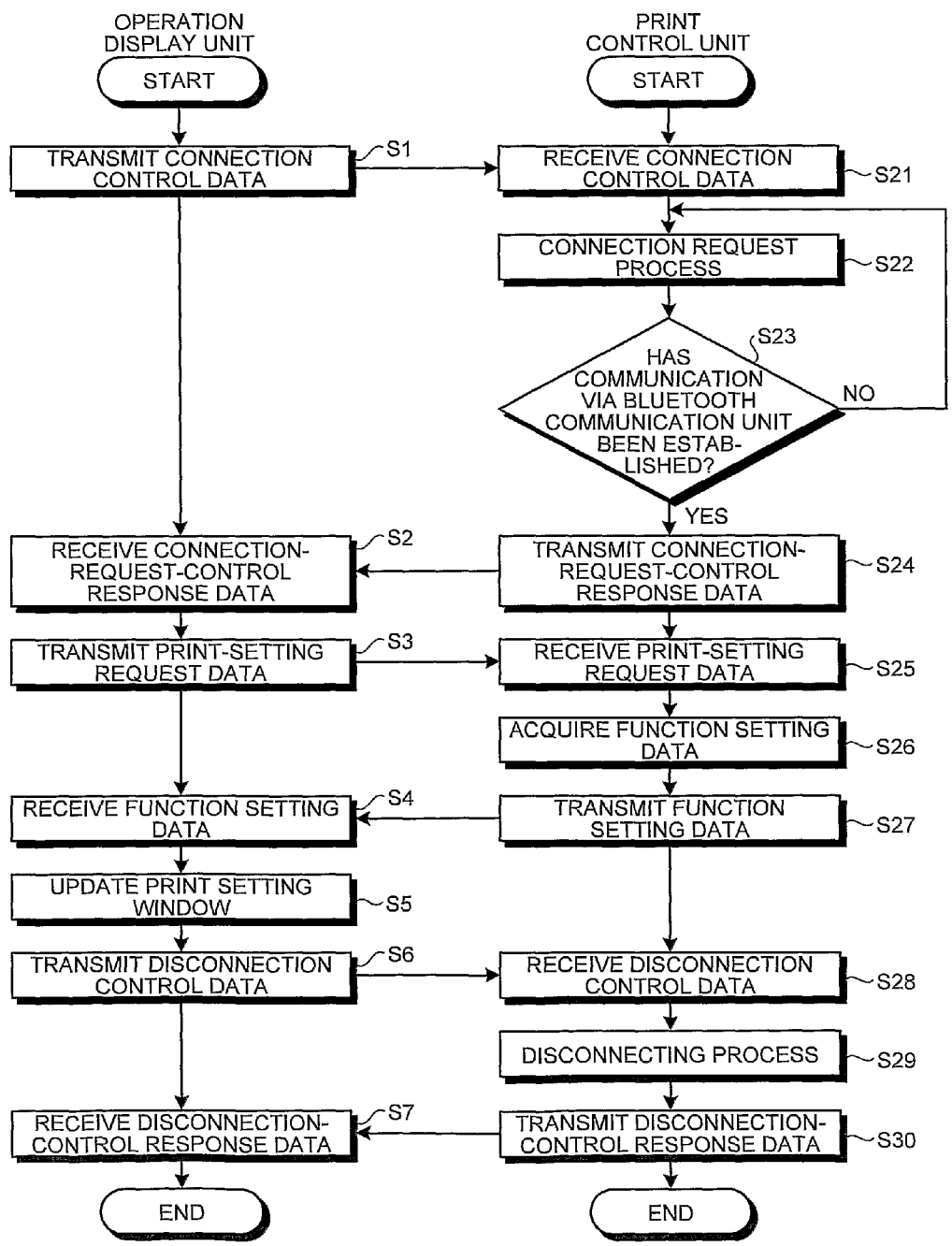
FIG. 7 is a flowchart of a process procedure to be performed by a portable terminal device.
Figure 8:
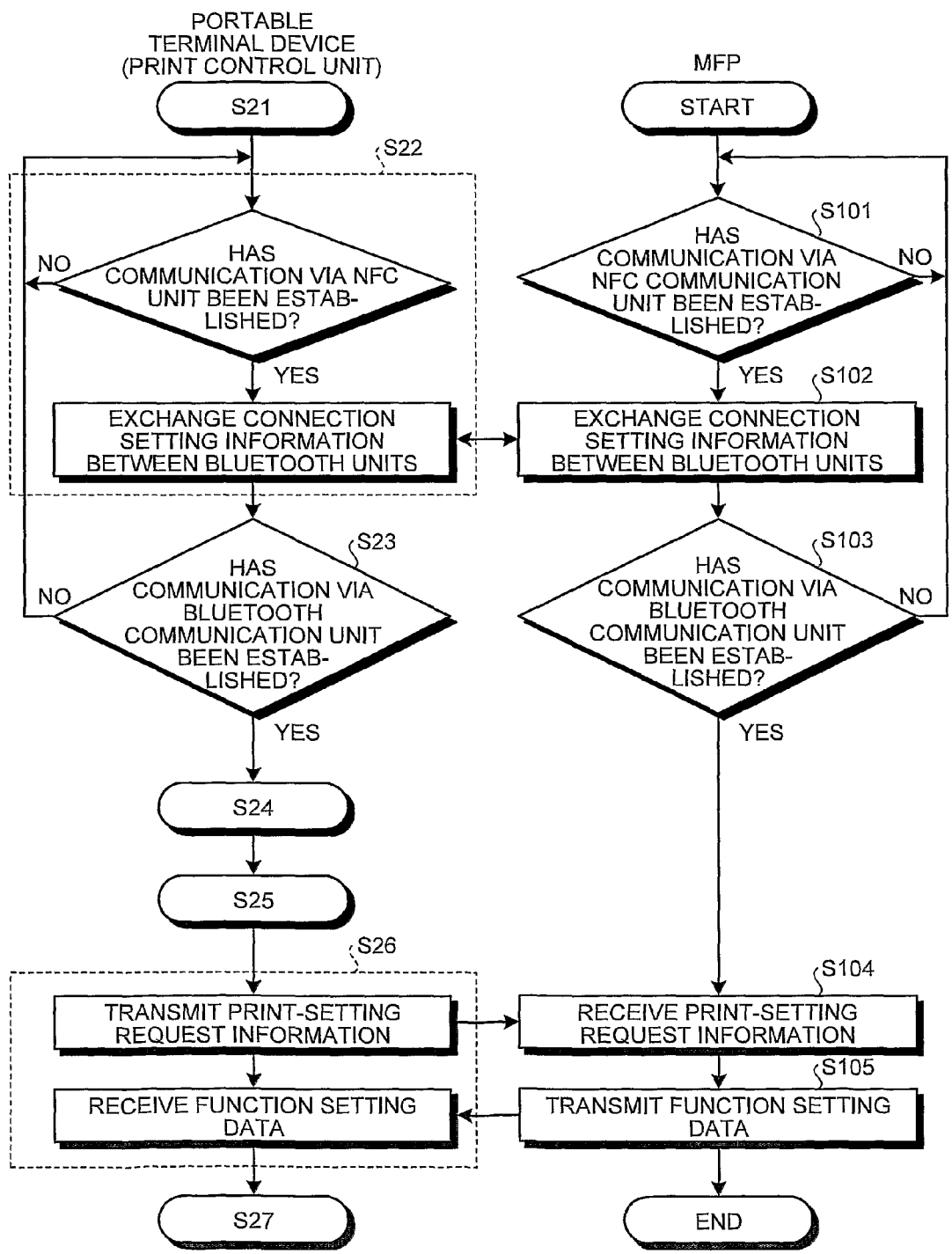
FIG. 8 is a flowchart of a process procedure of acquiring print setting items.

With the information processing system 10 that includes the MFP 100 and the portable terminal device 200 configured as discussed above, how the portable terminal device 200 acquires print setting items from the MFP 100 will be described below. FIG. 7 is a flowchart of a process procedure to be performed by the portable terminal device 200. FIG. 8 is a flowchart of a process procedure of acquiring print setting items.

A user clicks the sync icon I on the print setting window X1 to make a request for connection to a printer of the MFP 100. Put another way, the sync I serves as a synchronization declaration unit that receives an operation of declaring that setting items applicable to the MFP 100 and setting items that can be selected from the portable terminal device 200 are to be synchronized.

Upon receiving a signal indicating that the sync icon I has been clicked from the operation input unit 204, the operation display unit 205 transmits connection control data <requestConnect/> to the print control unit 206 (Step S1). The print control unit 206 receives the connection control data <requestConnect/> from the operation display unit 205 (Step S21) and displays a guide window Y1 illustrated in FIG. 9 on the operation display unit 205. The guide window Y1 illustrated in FIG. 9 displays a message "BRING INTO CONTACT WITH PRINTER" to prompt the user to bring the portable terminal device 200 into contact with the MFP 100.

A connection request process (Step S22) is performed as follows. According to the guide window Y1, the user causes the portable terminal device 200 to come near the MFP 100 and enter an area where the NFC communication unit 201 of the portable terminal device 200 and the NFC unit 101 of the MFP 100 can communicate with each other, whereby communication (near field communication) between the NFC communication unit 201 of the portable terminal device 200 and the NFC unit 101 of the MFP 100 is established.

As illustrated in FIG. 8, when the communication (near field communication) between the NFC communication unit 201 of the portable terminal device 200 and the NFC unit 101 of the MFP 100 has been established (Yes at Step S101), the MFP 100 receives connection setting information by carrying out NFC communication via the NFC communication unit 201 of the portable terminal device 200 and the NFC unit 101 of the MFP 100. The connection setting information can include, for instance, a Bluetooth device (BD) address and a pass phrase of Bluetooth technology.

The Bluetooth communication unit 102 of the MFP 100 and the Bluetooth communication unit 202 of the portable terminal device 200 exchange the connection setting information with each other (Step S102).

When the Bluetooth communication with the MFP 100 has been established by exchanging the connection setting information (Yes at Step S23) (Yes at Step S103), the print control unit 206 of the portable terminal device 200 transmits connection-request-control response data <requestConnectResult/> to the operation display unit 205 (Step S24). When the communication has not been established (No at Step S23), the connection request process is performed again (Step S22).

Upon receiving the connection-request-control response data <requestConnectResult/> from the print control unit 206 (Step S2), the operation display unit 205 of the portable terminal device 200 transmits print-setting request data to the print control unit 206 (Step S3). If the control data is described in XML as illustrated in FIG. 4, the following <requestCondition> tags can be used:

<requestCondition>
<all/>
</requestCondition>
where <all> tag indicates that all setting items of the printer are requested.

Upon receiving the print-setting request data (Step S25), the print control unit 206 of the portable terminal device 200 acquires function setting data (Step S26). More specifically, the print control unit 206 transmits a PJL command that serves as the print-setting request information and requests function setting data to the MFP 100 via the Bluetooth communication unit 202 at Step S26.

As illustrated in FIG. 8, upon receiving the print-setting request information via the Bluetooth communication unit 102 (Step S104), the control unit 111 of the MFP 100 acquires, as the function setting data, PJL data from the setting-information storage unit 110 and transmits the function setting data to the print control unit 206 of the portable terminal device 200 as a response (Step S105).

The print control unit 206 of the portable terminal device 200 converts the thus-acquired function setting data to XML as illustrated in FIG. 10 and transmits the data to the operation display unit 205 (Step S27). The function setting information illustrated in FIG. 10 differs from the thus-converted data illustrated in FIG. 4 in additionally including <state> tags. The <state> tags are used to define whether a setting item surrounded with <mode> tags is applicable (TRUE) or not (FALSE).

The conversion to XML to be performed at Step S27 can be processed as follows. Specifically, if the function setting data acquired from the MFP 100 contains a setting item surrounded with <mode> tags, the <state> tag element is set as TRUE; if not, the <state> tag element is set as FALSE.

Figure 11:
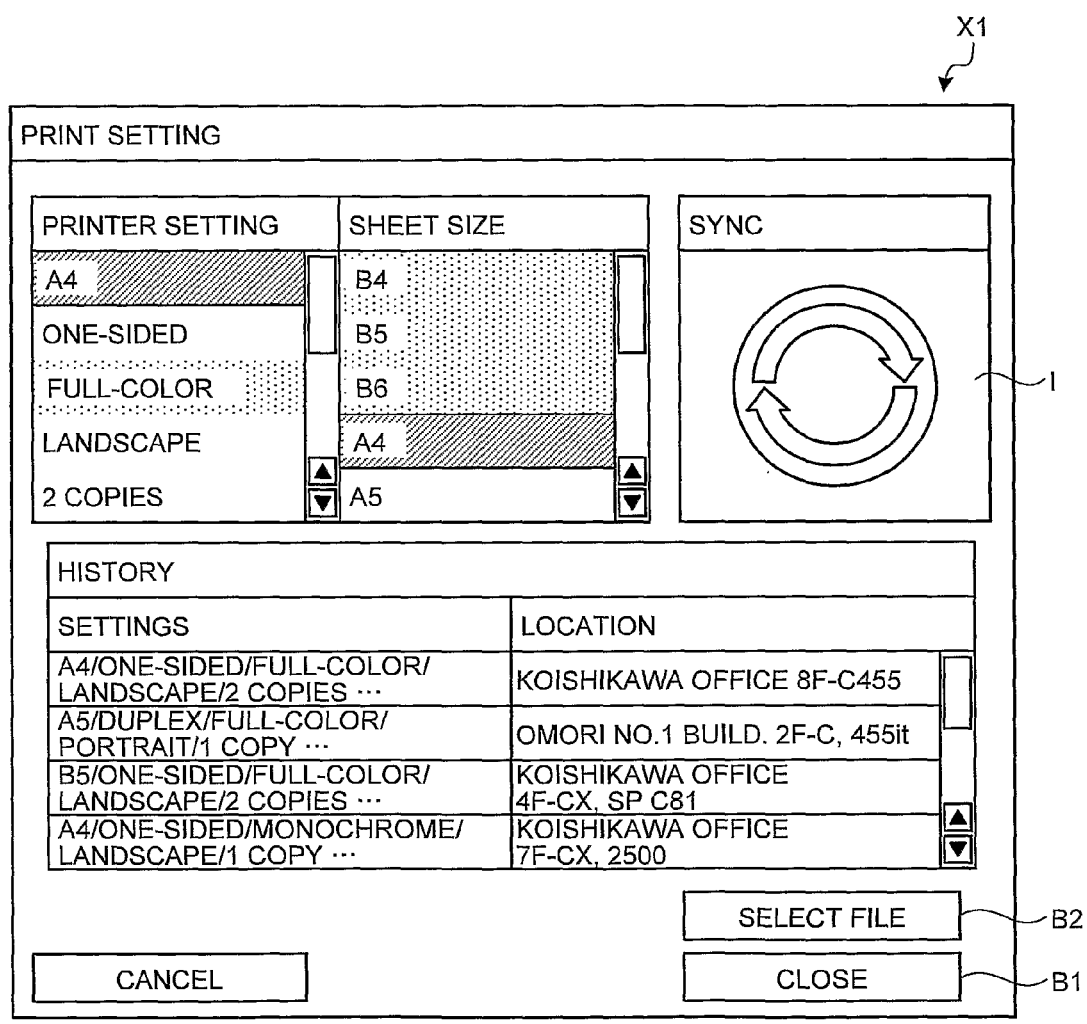
FIG. 11 is a schematic diagram illustrating an example of a print setting window.

Upon receiving the function setting data from the print control unit 206 (Step S4), the operation display unit 205 of the portable terminal device 200 updates setting items on the print setting window X1 illustrated in FIG. 6 (Step S5). In a case where the thus-updated setting items include an unavailable setting item, the unavailable setting item is grayed out as illustrated in FIG. 11. In the example given in FIG. 10, 2 (color) is unavailable as setting for the item "color/black&white"; therefore, the printer setting window illustrated in FIG. 11 is updated such that a portion corresponding to the "full-color" is grayed out. Similarly, a sheet size window is updated, by referring to a response given in FIG. 10, such that portions (B4, B5, and B6) corresponding to set values, for which "FALSE" is placed in <state> tags and whose ID number is 4 (print sheet size), are grayed out.

The operation display unit 205 of the portable terminal device 200 thereafter transmits, when a "CLOSE" button B1 displayed on the operation display unit 205 is clicked by a user, disconnection control data <requestDisconnect/> to the print control unit 206 (Step S6).

Alternatively, a configuration, in which the disconnection control data is transmitted immediately after the setting items on the print setting window X1 is updated without waiting for the "CLOSE" button B1 to be clicked, can be employed.

Upon receiving the disconnection control data (Step S28), the print control unit 206 of the portable terminal device 200 performs a process of disconnecting the Bluetooth communication with the MFP 100 (Step S29) and transmits disconnection-control response data <requestDisconnectResult/> to the operation display unit 205 as a response (Step S30). This allows to carry out communication only when necessary, thereby ensuring security.

After receiving the disconnection-control response data from the print control unit 206 (Step S7), the process performed by the operation display unit 205 of the portable terminal device 200 ends.

Figure 12:
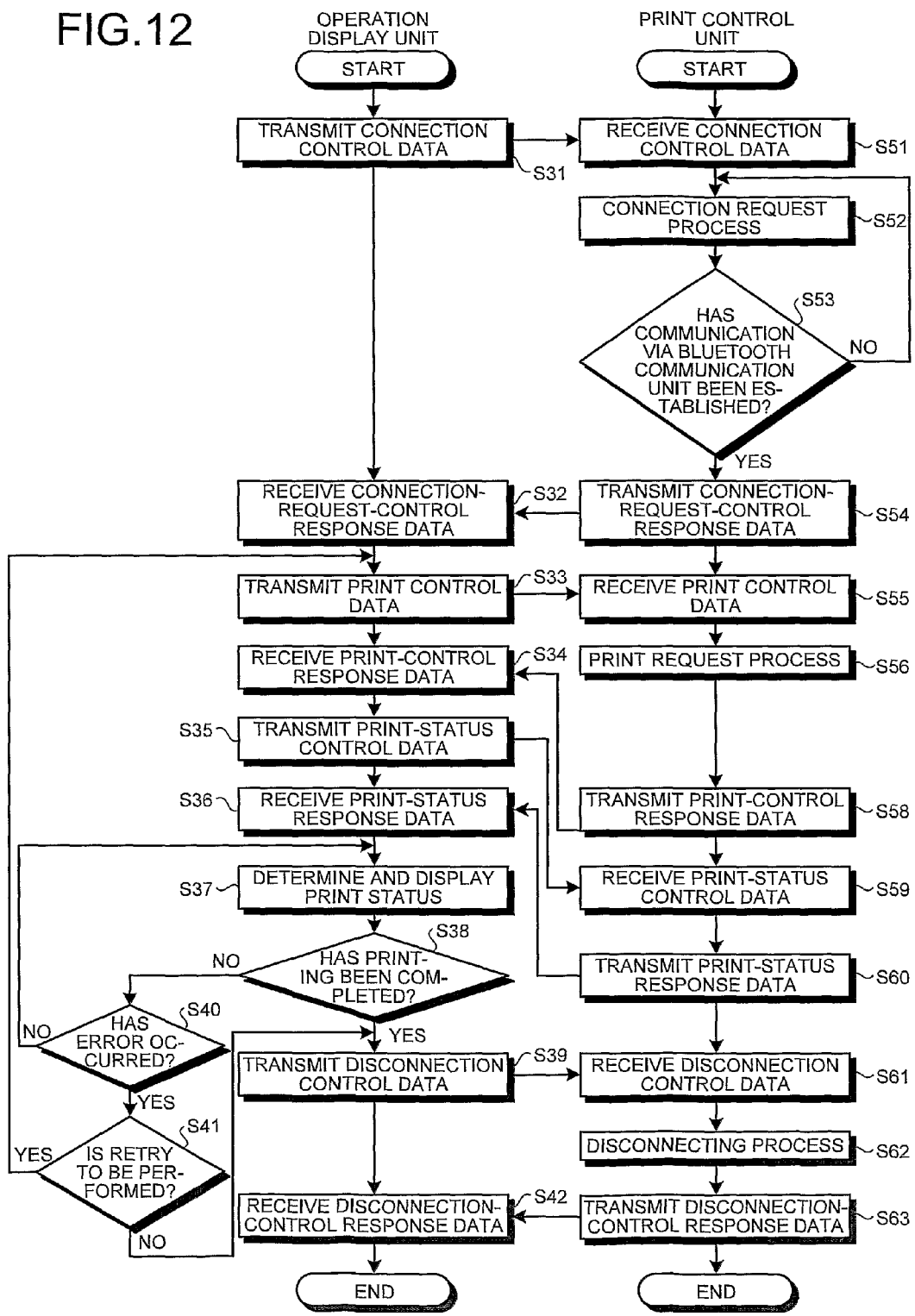
FIG. 12 is a flowchart of a process procedure to be performed by the portable terminal device.
Figure 13:
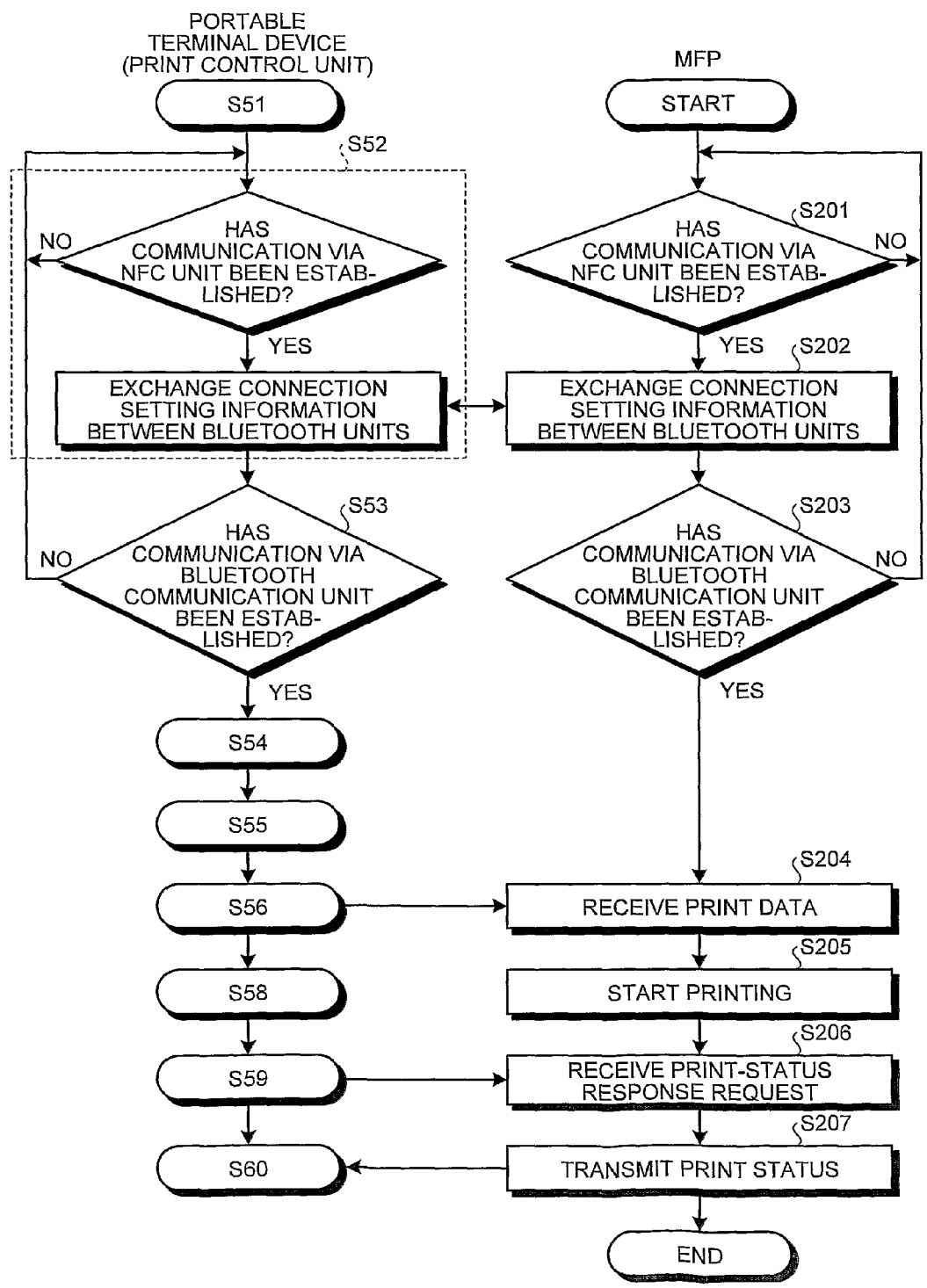
FIG. 13 is a flowchart of a procedure of a print request process.

A print request process, in which the portable terminal device 200 requests the MFP 100 to perform printing, will be described below. FIG. 12 is a flowchart of a process procedure to be performed by the portable terminal device 200. FIG. 13 is a flowchart of a procedure of the print request process.

Figure 14:
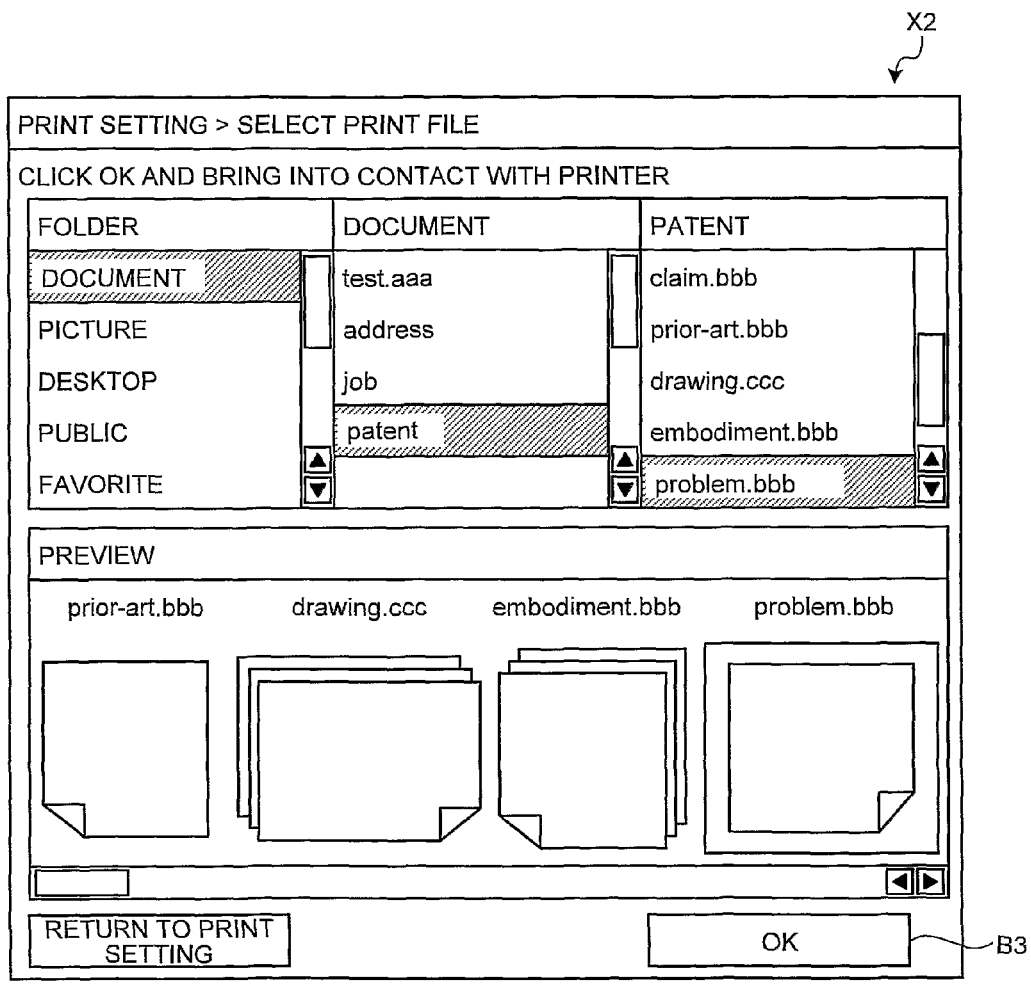
FIG. 14 is a schematic diagram illustrating an example of a print-file selecting window.

When print settings have been set from the print setting window X1 illustrated in FIG. 6 and a "SELECT FILE" button B2 is clicked by a user, the operation display unit 205 of the portable terminal device 200 switches a view on the operation display unit 205 to a print-file selecting window X2 as illustrated in FIG. 14.

Meanwhile, values for print settings specified by a user from the print setting window X1 illustrated in FIG. 6 are stored as historical information in the data storage unit 203. Based on the historical information, a function of a historical-information storage unit is implemented. The historical information contains function setting information and can be described in any one of a structured format, such as XML, and an unstructured format, such as a text format. As illustrated in FIG. 6, the historical information is displayed in a lower section of the print setting window X1, in which function setting information and printing locations are displayed. It is configured such that by selecting any one of the historical information pieces, settings corresponding to the historical information piece are read out from the data storage unit 203 and setting items are set. In this manner, storing function settings having previously been specified by a user, allows reuse of the previously specified function setting information, thereby facilitating setting operation.

As illustrated in FIG. 14, the print-file selecting window X2 is configured to include an upper section, in which a three-level hierarchical structure list is provided, whereby a file can be selected by using the list. Preview images each indicating a setting status of a file are displayed in a lower section of the print-file selecting window X2.

A user makes a print request by selecting a file to be printed from the three-level hierarchical structure list in the upper section of the print-file selecting window X2 illustrated in FIG. 14 and clicking an "OK" button B3.

Figure 9:
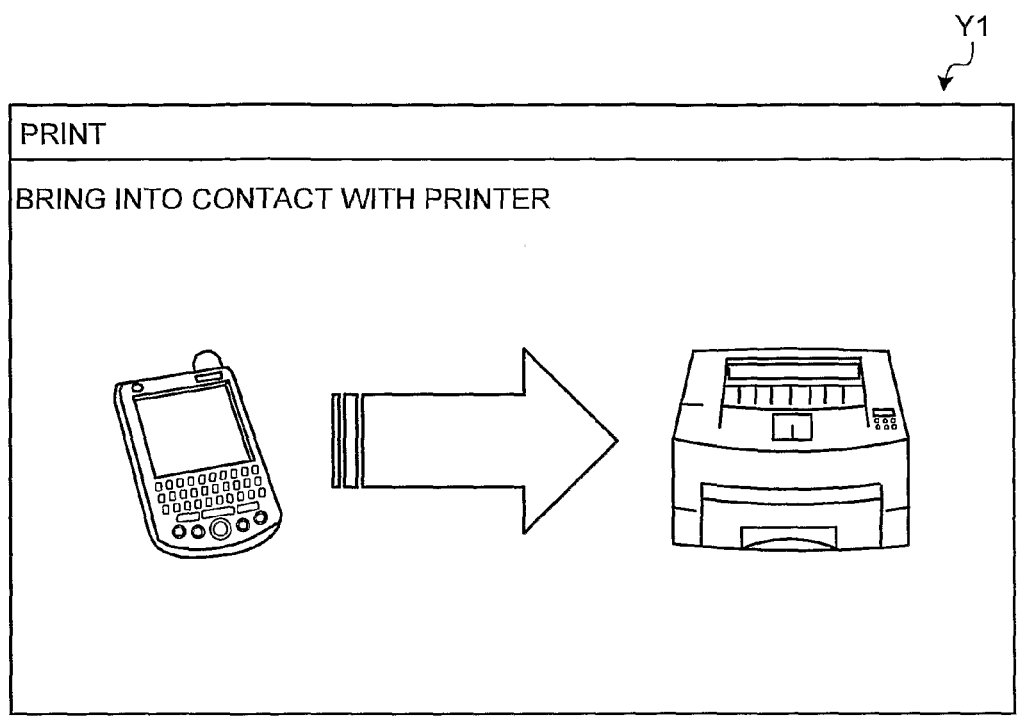
FIG. 9 is a schematic diagram illustrating an example of a guide window.

Upon receiving the print request, the operation display unit 205 of the portable terminal device 200 displays the guide window Y1 illustrated in FIG. 9 and transmits connection control data <requestConnect/> that contains connection setting information to the print control unit 206 by carrying out the NFC communication via the NFC communication unit 201 of the portable terminal device 200 and the NFC unit 101 of the MFP 100 (Step S31). The guide window Y1 illustrated in FIG. 9 displays the message "BRING INTO CONTACT WITH PRINTER" to prompt the user to bring the portable terminal device 200 near the MFP 100.

The print control unit 206 of the portable terminal device 200 receives the connection control data <requestConnect/> that contains the connection setting information from the operation display unit 205 (Step S51), and performs a process of requesting connection with the data processing unit 106 (Step S52). The connection request process (Step S52) is performed as follows. According to the guide window Y1, the user causes the portable terminal device 200 to come near the MFP 100 and enter an area where the NFC communication unit 201 of the portable terminal device 200 and the NFC unit 101 of the MFP 100 can communicate with each other, whereby communication (near field communication)

between the NFC communication unit 201 of the portable terminal device 200 and the NFC unit 101 of the MFP 100 is established.

As illustrated in FIG. 13, when the communication (near field communication) between the NFC unit 201 of the portable terminal device 200 and the NFC unit 101 of the MFP 100 has been established (Yes at Step S201), the MFP 100 carries out NFC communication via the NFC communication unit 201 of the portable terminal device 200 and the NFC unit 101 of the MFP 100 to receive connection setting information. The connection setting information can be, for instance, a BD address or a pass phrase of the Bluetooth technology.

The Bluetooth communication unit 102 of the MFP 100 and the Bluetooth communication unit 202 of the portable terminal device 200 exchange the connection setting information with each other (Step S202).

When the Bluetooth communication with the MFP 100 has been established by exchanging the connection setting information (Yes at Step S53) (Yes at Step S203), the MFP 100 transmits connection-request-control response data <requestConnectResult/> to the portable terminal device 200 via the Bluetooth communication unit 102 (Step S54). When the communication has not been established (No at Step S53), the process of requesting connection with the data processing unit 106 is performed again (Step S52).

Upon receiving the connection-request-control response data <requestConnectResult/> (Step S32), the operation display unit 205 of the portable terminal device 200 transmits print control data (see, e.g., FIG. 4) to the print control unit 206 (Step S33).

Upon receiving the print control data (Step S55), the print control unit 206 of the portable terminal device 200 performs the print request process as illustrated in FIG. 13 (Step S56). In a print request process, the print control unit 206 generates print data by combining PJL data that indicates print settings items and data specified by a file name together based on the tag elements illustrated in FIG. 4. Thereafter, the print data is transmitted to the MFP 100.

As illustrated in FIG. 13, upon receiving the print data (the file to be printed and the setting information) via the Bluetooth communication unit 202 (Step S204), the control unit 111 of the MFP 100 controls the data processing unit 106 and the printer unit 107 so as to start image processing, layout processing, and the like of the print data and printing of the thus-processed image data (Step S205).

The print control unit 206 of the portable terminal device 200 transmits print-control response data <requestPrintStartResult/> (Step S58).

Upon receiving the print-control response data <requestPrintStartResult/> from the print control unit 206 (Step S34), the operation display unit 205 of the portable terminal device 200 transmits print-status control data to the print control unit 206 (Step S35).

Upon receiving the print-status control data, the print control unit 206 of the portable terminal device 200 transmits a PJL command that requests a print status response via the Bluetooth communication unit 202 (Step S59).

As illustrated in FIG. 13, upon receiving the print-status response request (Step S206), the control unit 111 of the MFP 100 queries the data processing unit and transmits PJL data that indicates a print status (print completed, print in progress, print error, or no print job) via the Bluetooth communication unit 102 (Step S207).

The print control unit 206 of the portable terminal device 200 receives the PJL data via the Bluetooth communication unit 202, analyzes and converts the PJL data into print-status response data that contains any one of the print statuses (print completed, print in progress, print error, and no print job), and transmits the print-status response data to the operation display unit 205 (Step S60). An example of the print-status response data is given below. Any one of the statuses delimited by "|" below can be placed in <JobStatus> tags.

```
<requestJobStatusResult>
<jobStatus>Success|Processing|Failure|Nojob</jobStatus>
</requestJobStatusResult>
```

The operation display unit 205 of the portable terminal device 200 receives the print-status response data from the print control unit 206 (Step S36), determines the print status from the print-control response data, and displays a window that indicates the print status (Step S37).

Figure 15:
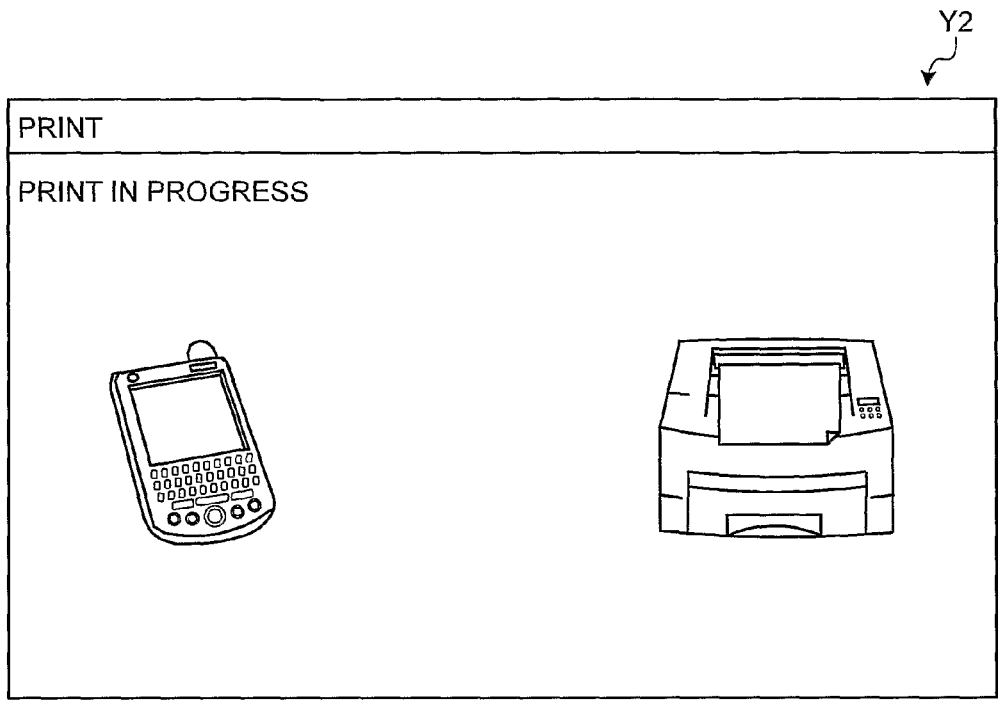
FIG. 15 is a schematic diagram illustrating an example of a print-in-progress window.

For instance, if print status according to the print-status response data is "print in progress," the operation display unit 205 of the portable terminal device 200 displays a print-in-progress window Y2 as illustrated in FIG. 15.

If it is determined that printing has been completed (Yes at Step S38), the operation display unit 205 of the portable terminal device 200 transmits disconnection control data to the print control unit 206 (Step S39).

Figure 16:
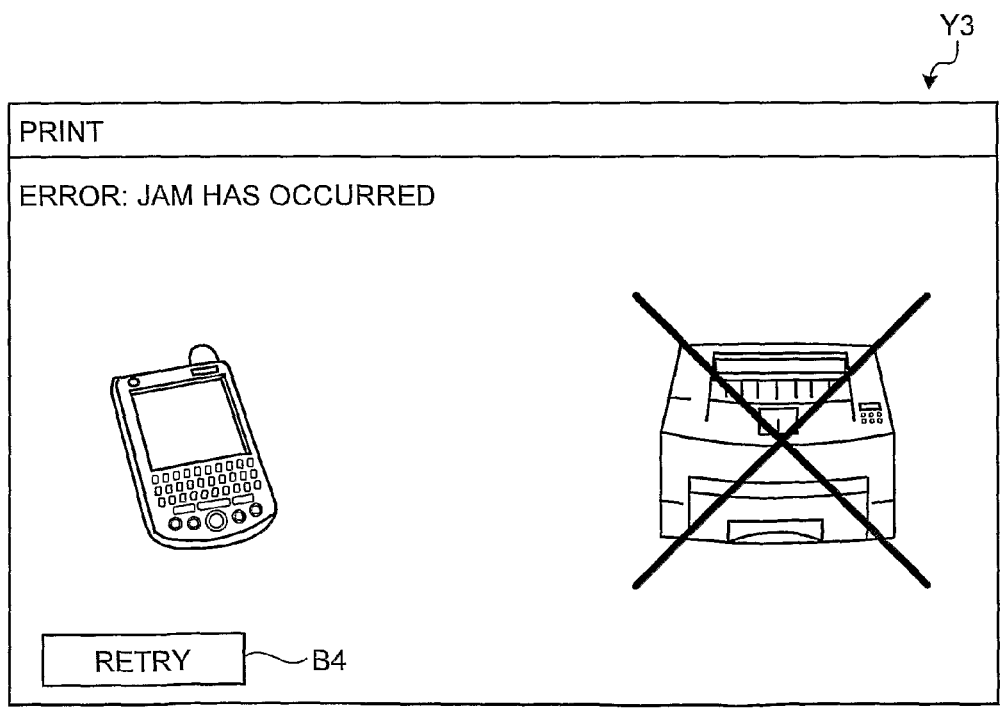
FIG. 16 is a schematic diagram illustrating an example of a print-error window.

If it is determined that printing has not been completed and a print error has occurred, the operation display unit 205 of the portable terminal device 200 displays a print-error window Y3 as illustrated in FIG. 16 (Step S37) and, on condition that a "RETRY" button B4 provided on the print-error window Y3 is clicked by a user, the operation display unit 205 of the portable terminal device 200 transmits print control data (see, e.g., FIG. 4) to the print control unit 206 again (No at Step S38, Yes at Step S40, and Yes at Step S41). If the "RETRY" button B4 provided on the print-error window Y3 is not clicked by the user (No at Step S38, Yes at Step S40, and No at Step S41), after duration of a predetermined period, the operation display unit 205 of the portable terminal device 200 transmits disconnection control data <requestDisconnect/> to the print control unit 206 (Step S39).

Notifying a user about an operating status of the MFP 100 as discussed above can facilitate user convenience.

Upon receiving the disconnection control data (Step S61), the print control unit 206 of the portable terminal device 200 performs a process of disconnecting the Bluetooth communication with the MFP 100 (Step S62) and transmits disconnection-control response data <requestDisconnectResult/> to the operation display unit 205 as a response (Step S63). This allows to carry out communication only when necessary, thereby ensuring security.

After receiving the disconnection-control response data <requestDisconnectResult/> from the print control unit 206 (Step S42), the process performed by the operation display unit 205 of the portable terminal device 200 ends.

According to the present embodiment, as discussed above, it is allowed to view and specify setting items that can are available on the MFP 100, with which the portable terminal device 200 establishes wireless communication, on and from the portable terminal device 200 by receiving setting items from the MFP 100 as a response to a setting item request that requests setting items related to image processing provided by the MFP 100, which is an information processing apparatus, via the short-range communication unit (the Bluetooth communication), and displaying a setting window, on which the thus-received setting items are displayed in a selectable manner. Accordingly, user convenience can be facilitated.

According to the present embodiment, a user can configure settings as desired depending on a setting status of the MFP 100 when performing printing.

In the present embodiment, the present invention is applied to the portable terminal device 200, but not limited thereto, and can be applied to a device, such as a digital camera or a PC, that has a function of transmitting and receiving data by carrying out wireless communication.

Figure 17:
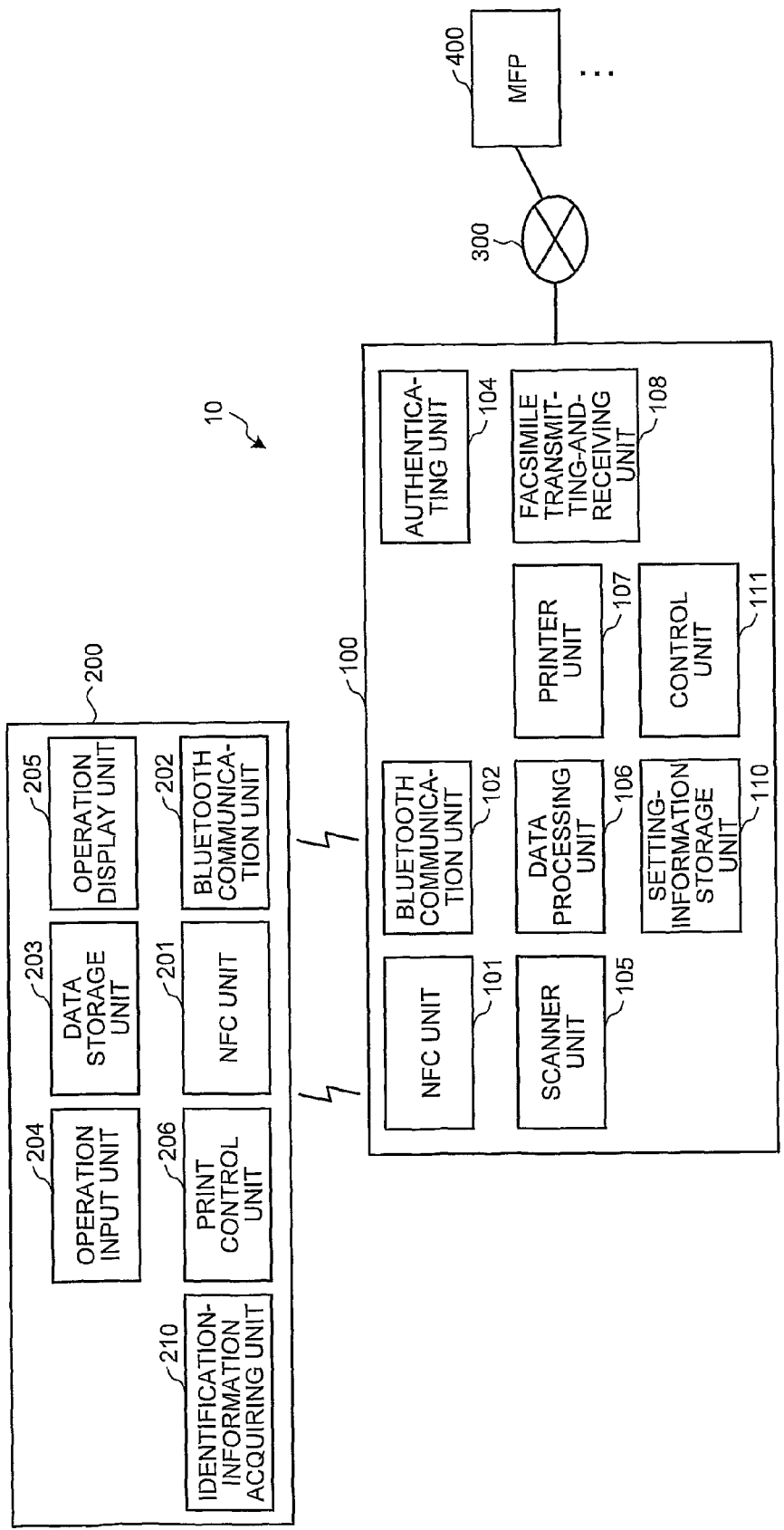
FIG. 17 is a block diagram illustrating the configuration of a modification of the information processing system.

A modification of the information processing system 10 will be described below. FIG. 17 is a block diagram illustrating the configuration of the modification of the information processing system 10. As illustrated in FIG. 17, this configuration differs from that of the information processing system 10 illustrated in FIG. 3 in additionally including an identification-information acquiring unit 210 serving as an identification-information acquiring unit.

The identification-information acquiring unit 210 acquires at least one type of identification information. Examples of the identification information include information about a model of the MFP 100, physical location information about the portable terminal device 200, information that characterizes the user (a user ID, the name of department to which the user belongs, a job class, print frequency, and the like), and information related to charge (a user identification information, data on amount charged, and the like).

The print control unit 206 relates function setting information having been set by a user in advance with the identification information acquired by the identification-information acquiring unit 210 as illustrated in FIG. 18, and stores the thus-related function setting information in the data storage unit 203 as historical information.

Figure 19:
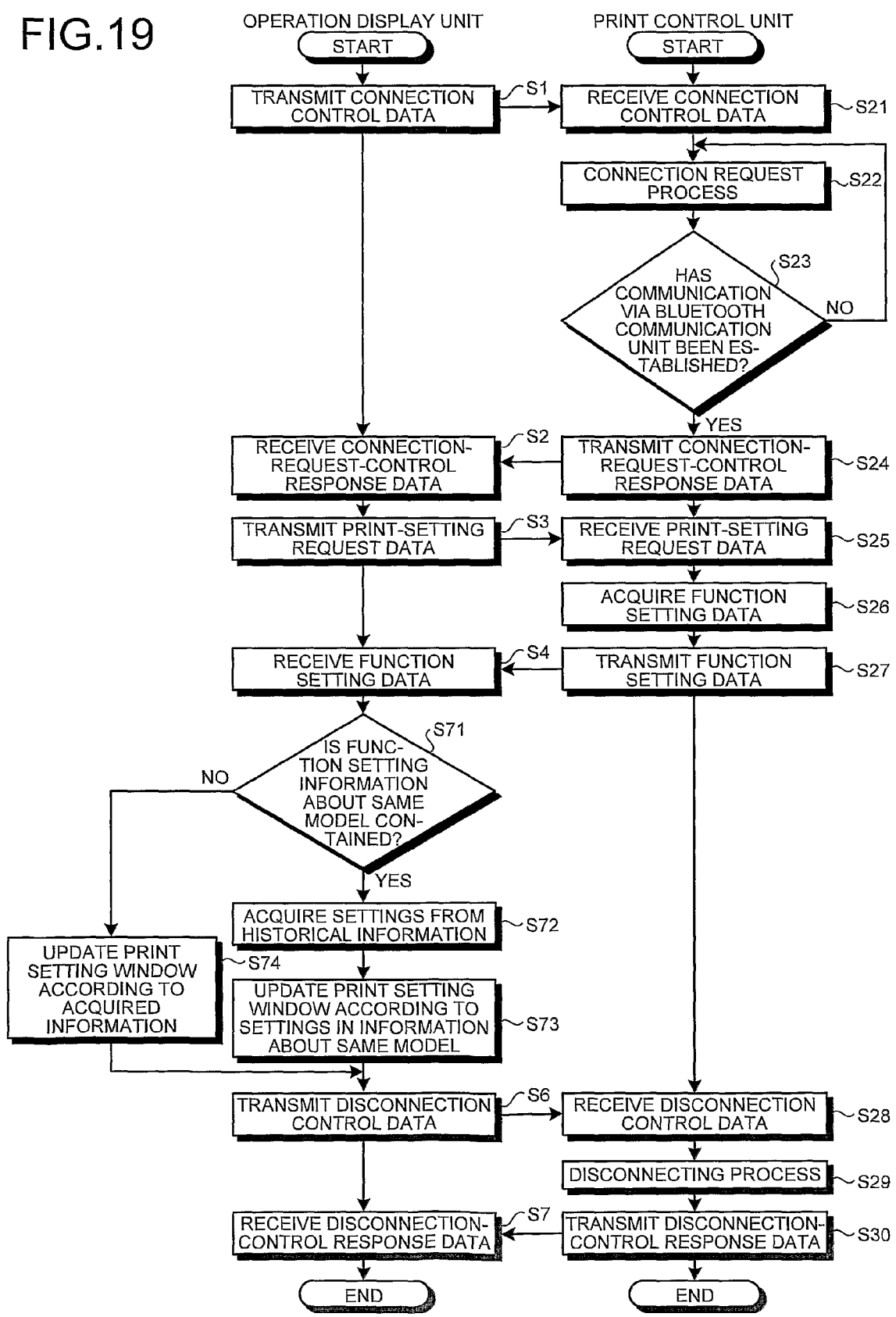
FIG. 19 is a flowchart of a process procedure of acquiring historical information based on information about a model.

A process procedure of acquiring history based on information about a model of the MFP 100 will be described below with reference to the flowchart illustrated in FIG. 19.

A user clicks the sync icon I on the print setting window X1 to make a request for connection to a printer of the MFP 100.

Upon receiving a signal indicating that the sync icon I has been clicked from the operation input unit 204, the operation display unit 205 transmits connection control data <requestConnect/> to the print control unit 206 (Step S1). The print control unit 206 receives the connection control data <requestConnect/> from the operation display unit 205 (Step S21) and displays the guide window Y1 illustrated in FIG. 9 on the operation display unit 205. The guide window Y1 illustrated in FIG. 9 displays the message "BRING INTO CONTACT WITH PRINTER" to prompt the user to bring the portable terminal device 200 into contact with the MFP 100.

A connection request process (Step S22) is performed as follows. According to the guide window Y1, a user causes the portable terminal device 200 to come near the MFP 100 and enter the area where the NFC communication unit 201 of the portable terminal device 200 and the NFC unit 101 of the MFP 100 can communicate with each other, whereby communication (near field communication) between the NFC communication unit 201 of the portable terminal device 200 and the NFC unit 101 of the MFP 100 is established.

As illustrated in FIG. 8, when the communication (near field communication) between the NFC communication unit 201 of the portable terminal device 200 and the NFC unit 101 of the MFP 100 has been established (Yes at Step S101), the MFP 100 receives connection setting information by carrying out NFC communication via the NFC communication unit 201 of the portable terminal device 200 and the NFC unit 101 of the MFP 100. The connection setting information can be, for instance, a BD address or a pass phrase of the Bluetooth technology.

The Bluetooth communication unit 102 of the MFP 100 and the Bluetooth communication unit 202 of the portable terminal device 200 exchange the connection setting information with each other (Step S102).

When the Bluetooth communication with the MFP 100 has been established by exchanging the connection setting information (Yes at Step S23) (Yes at Step S103), the print control unit 206 of the portable terminal device 200 transmits connection-request-control response data <requestConnectResult/> to the operation display unit 205 (Step S24). When the communication has not been established (No at Step S23), the connection request process is performed again (Step S22).

Upon receiving the connection-request-control response data <requestConnectResult/> from the print control unit 206 (Step S2), the operation display unit 205 of the portable terminal device 200 transmits print-setting request data to the print control unit 206 (Step S3). If the control data is described in XML as illustrated in FIG. 4, the following <requestCondition> tags can be used:

```
<requestCondition>
    <all/>
</requestCondition>
``` where <all> tag indicates that all setting items of the printer are requested.

Upon receiving the print-setting request data (Step S25), the print control unit 206 of the portable terminal device 200 transmits a PJL command that serves as the print-setting request information and requests function setting data to the MFP 100 via the Bluetooth communication unit 202 (Step S26).

As illustrated in FIG. 8, upon receiving the print-setting request information via the Bluetooth communication unit 102 (Step S104), the control unit 111 of the MFP 100 acquires, as the function setting data, PJL data from the setting-information storage unit 110 and transmits the PJL data to the print control unit 206 of the portable terminal device 200 as a response (Step S105).

The print control unit 206 of the portable terminal device 200 converts the thus-acquired function setting data to XML as illustrated in FIG. 10 and transmits the thus-converted data to the operation display unit 205 (Step S27). The function setting information illustrated in FIG. 10 differs from the data illustrated in FIG. 4 in additionally including <state> tags. The <state> tags are used to define whether a setting item surrounded with <mode> tags is applicable (TRUE) or not (FALSE).

The conversion to XML to be performed at Step S27 can be processed as follows. Specifically, if the function setting data acquired from the MFP 100 contains a setting item surrounded with <mode> tags, the <state> tag element is set as TRUE; if not, the <state> tag element is set as FALSE.

Upon receiving the function setting data from the print control unit 206 (Step S4), the operation display unit 205 of the portable terminal device 200 controls the identification-information acquiring unit 210 to determine whether the historical information stored in the data storage unit 203 contains function setting information about the same model as the model of the MFP 100 (Step S71). If the historical information contains the function setting information about the same model (Yes at Step S71), the operation display unit 205 acquires settings from the historical information (Step S72), updates and displays the print setting window X1 according to the settings (see FIG. 18) (Step S73). In contrast, if the historical information does not contain the function setting information about the same model (No at Step S71), the operation display unit 205 of the portable terminal device 200 updates the print setting window X1 according to the function setting information having been acquired (Step S74).

According to the present embodiment, as discussed above, a user is allowed to immediately utilize settings having previously been set on the same model, which facilitates convenience.

The operation display unit 205 of the portable terminal device 200 thereafter transmits, when the "CLOSE" button B1 displayed on the operation display unit 205 is clicked by the user, disconnect control data <requestDisconnect/> to the print control unit 206 (Step S6).

Alternatively, a configuration, in which the disconnection control data is transmitted immediately after the setting items on the print setting window X1 is updated without waiting for the "CLOSE" button B1 to be clicked, can be employed.

Upon receiving the disconnection control data (Step S28), the print control unit 206 of the portable terminal device 200 performs a process of disconnecting the Bluetooth communication with the MFP 100 (Step S29), and transmits disconnection-control response data <requestDisconnectResult/> to the operation display unit 205 as a response (Step S30). This allows to carry out communication only when necessary, thereby ensuring security.

After receiving the disconnection-control response data from the print control unit 206 (Step S7), the process performed by the operation display unit 205 of the portable terminal device 200 ends.

Changing a copying detection level contained in setting information according to physical location information about the portable terminal device 200 will be described below with reference to the flowchart illustrated in FIG. 20. Physical location information about the portable terminal device 200 can be acquired by utilizing a global positioning system (GPS).

Figure 20:
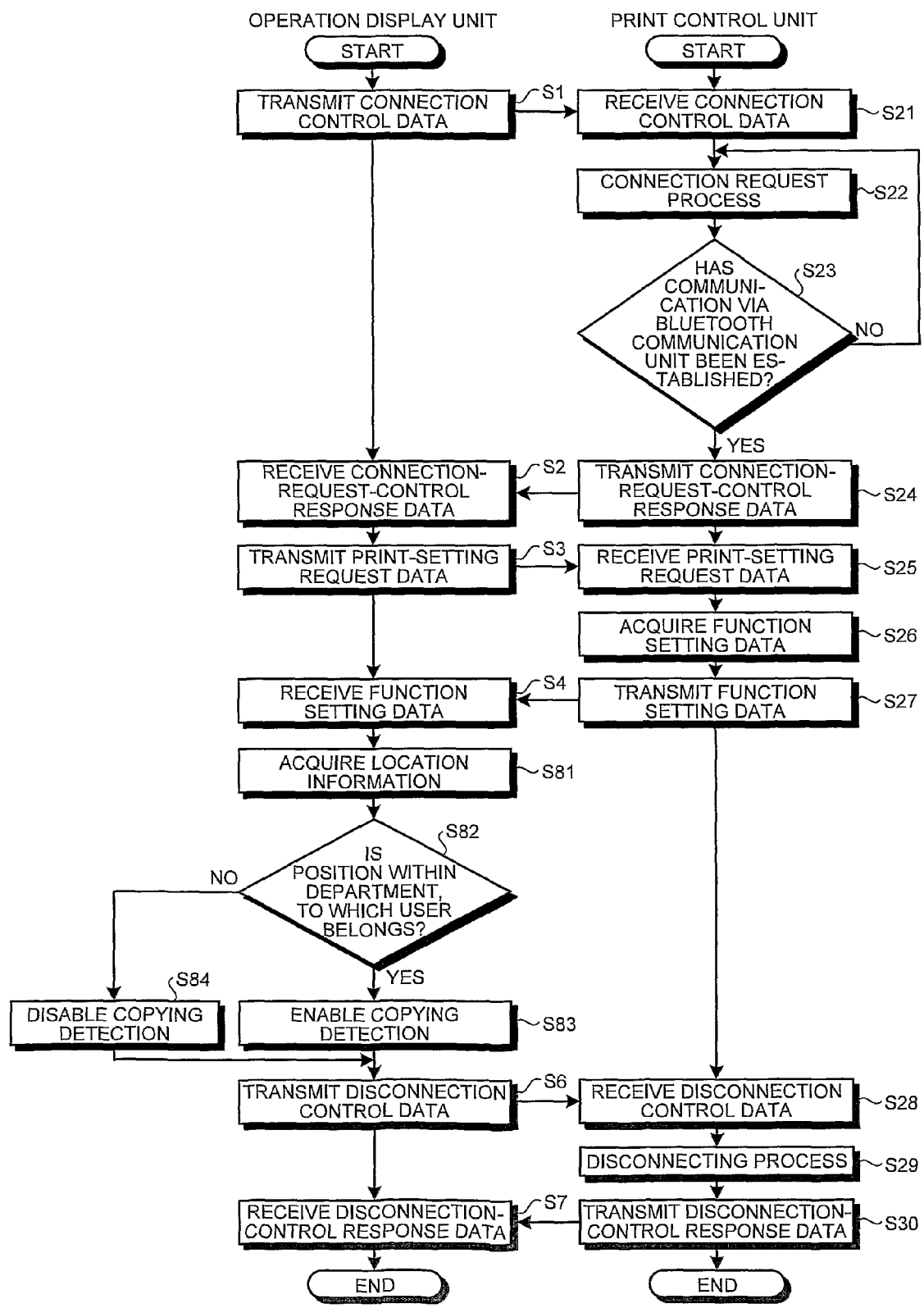
FIG. 20 is a flowchart of a process procedure of changing a copying detection level contained in setting information.

As illustrated in FIG. 20, upon receiving the function setting data from the print control unit 206 (Step S4), the operation display unit 205 of the portable terminal device 200 acquires physical location information about the portable terminal device 200 by controlling the identification-information acquiring unit 210, which is the GPS, or from historical information stored in the data storage unit 203 (Step S81). When the identification-information acquiring unit 210 has acquired the physical location information about the portable terminal device 200, the print control unit 206 of the portable terminal device 200 determines whether a position indicated by the physical location information about the portable terminal device 200 is currently within a department to which the user belongs (Step S82). Data about the department, to which the user belongs, is stored in the data storage unit 203 in advance so as to be used in the determination.

Figure 21:
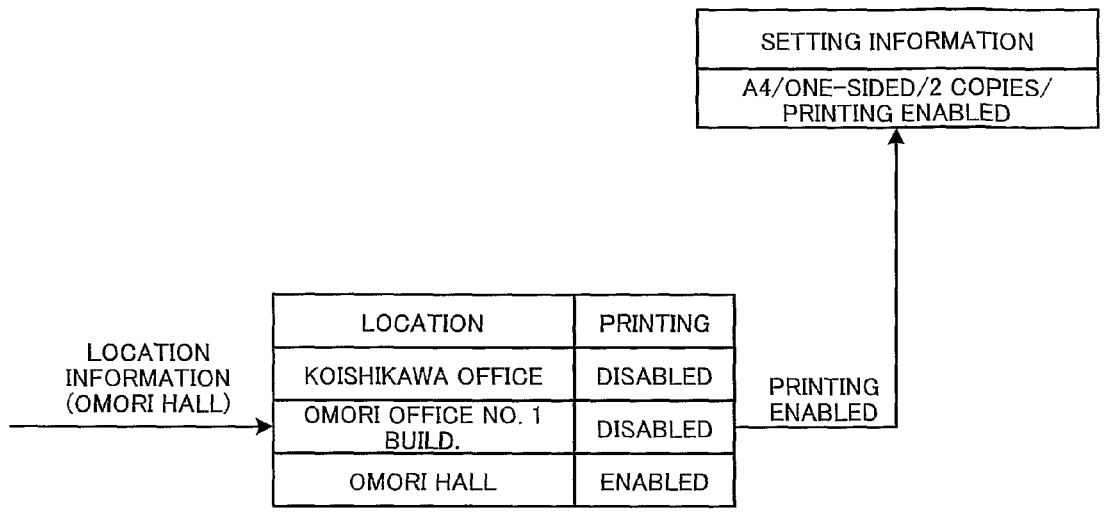
FIG. 21 is a schematic diagram illustrating an example of a copying-detection setting process contained in setting information.

If the position indicated by the current physical location information about the portable terminal device 200 is determined to be within the department to which the user belongs (Yes at Step S82), the print control unit 206 of the portable terminal device 200 enables copying detection in function setting information as illustrated in FIG. 21 (Step S83). If the position indicated by the current physical location information about the portable terminal device 200 is determined not to be within the department to which the user belongs (No at Step S82), the print control unit 206 of the portable terminal device 200 disables copying detection in the function setting information (Step S84).

How a process with copying detection enabled or disabled is performed will be described. With the copying detection enabled, when the print request process in the process procedure illustrated in FIG. 12 is performed by the control unit 111 of the MFP 100, a printout is output from the MFP 100 connected to the portable terminal device 200 as in the examples discussed above. In contrast, with the copying detection is disabled, a printout is not output from the MFP 100 connected to the portable terminal device 200. In such a case, the print control unit 206 of the portable terminal device 200 transmits data after adding such <mode> tags as given below to a portion surrounded with <condition> tags the data illustrated in FIG. 4.

If the copying detection is enabled,

```
<mode>
    <func>Print</func>
    <propertyid>13</propertyid>
    <value>1</value>
</mode>
``` are to be added while if the copying detection is disabled,

```
<mode>
    <func>Print</func>
    <propertyid>13</propertyid>
    <value> 2 </value>
</mode>
``` are to be added. The number 13 surrounded with <propertyid> tags corresponds to a setting for the copying detection enabled/disabled as illustrated in FIG. 5.

The process with the copying detection enabled or disabled is not limited to the example discussed above, and can be performed by applying a known print control function. For instance, a configuration in which, when copying is disabled, although a printout is output, the data processing unit 106 changes an image to be printed to a white image or a black image, or replaces an image to be printed with an image of only characters "copying prohibited," before the image is printed by the printer unit 107, can alternatively employed.

Meanwhile, the copying detection is typically enabled on an assumption that there is a relatively low possibility of occurrence of information leakage; however, there could be a case that a printout is passed to an unauthorized person or the like for any reason, and an unauthorized copy of the printout is made. To this end, a technique of embedding dot pattern information for inhibiting printed output or dot pattern information that damages document data in a background image or a front image of the document data so that the document data is printed with the dot pattern information superimposed thereon. As a technique for embedding such dot pattern information, the technique disclosed in Japanese Patent Application Laid-open No. 2004-260341 or the like can be used. According to the present embodiment, if a document image is obtained by scanning the printout produced with the technique mentioned above, it is allowed to determine whether to inhibit printing of the document image or whether to damage the document image before producing printout of the image based on the embedded dot pattern information. As a technique for detecting the dot pattern information, the technique disclosed in Japanese Patent Application Laid-open No. 2005-142918 or the like can be used.

According to the present embodiment, as discussed above, whether to enable or disable copying detection can automatically be determined depending on a location where a user performs printing. This facilitates user convenience as well as reduces possibility of information leakage. According to the present embodiment, even when making a copy of a printout is attempted, it is allowed to inhibit production of the printout or to damage a copied image before the copied image is printed out. Accordingly, a risk of information leakage can be avoided, which leads to further secure information handling.

According to the present embodiment, as discussed above, when data received from a portable terminal device via a short-range communication unit by using connection setting information received by an NFC unit is determined to contain data about image processing, processing performed by a data processing unit or a printer unit of an image forming apparatus is controlled in accordance with the data about image processing. This allows to print the data processed by the data processing unit according to the data about image processing control after wireless communication between the image forming apparatus and the portable terminal device has been established, whereby contents of image data or output of the image data can be controlled without involving operation performed a user who carries the portable terminal device or an administrator of the image forming apparatus. Accordingly, information leakage can be prevented without placing burden on the user and the administrator.

The invention claimed is:

1. An image forming apparatus the can communicate with a portal terminal device, the image forming apparatus comprising:
 a near field communication (NFC) unit that establishes, when the portable terminal device comes near the NFC unit, wireless communication with the portable terminal device;
 a short-range communication unit that has a larger wireless communication coverage than a wireless communication coverage of the NFC unit and that establishes wireless connection with the portable terminal device by using connection setting information received via the NFC unit;
 a data processing unit that performs data processing on data received from the portable terminal device via the short-range communication unit;
 a printer unit that prints out the processed data;
 a transmitting unit that transmits, to the portable terminal device via the short-range communication unit, function setting information defining whether each setting item of the image forming apparatus is applicable or not, so as to cause the portable terminal device to update setting items, which have been displayed on a printer setting window of the portable terminal device before the NFC unit establishes the wireless communication with the portable terminal device, such that an unavailable setting item is changed in display; and
 a control unit that controls, when the data received via the short-range communication unit is determined to contain data about image processing control, processing performed by at least one of the data processing unit and the printer unit in accordance with the data about image processing control.

2. The image forming apparatus according to claim 1, wherein when the data about image processing control is determined to contain data that indicates that copying is disabled, the control unit instructs the printer unit not to print out the processed data.

3. The image forming apparatus according to claim 1, wherein when the data about image processing control is determined to contain data that indicates that copying is disabled, the control unit instructs the data processing unit to replace the data to be printed with other data, and instructs the printer unit to print out the replaced data.

4. The image forming apparatus according to claim 1, wherein when the data about image processing control is determined to contain data that indicates that copying is disabled, the control unit instructs the data processing unit to damage data to be printed, and instructs the printer unit to print the damaged data.

5. The image forming apparatus according to claim 1, wherein when the data about image processing control is determined to contain data that indicates that copying is disabled, the control unit instructs the data processing unit to superimpose an image pattern indicating that copying of data to be printed is prohibited, and instructs the printer unit to print the superimposed data.

6. The image forming apparatus according to claim 5, further comprising a scanner unit that scans in an original to acquire image data, wherein when the image data acquired by the scanner unit is determined to contain the image pattern, the control unit controls at least one of the data processing unit and the printer unit to inhibit copying.

7. The image forming apparatus according to claim 6, wherein when the image data acquired by the scanner unit is determined to contain the image pattern, the control unit instructs the printer unit not to print out the processed data.

8. The image forming apparatus according to claim 6, wherein when the image data acquired by the scanner unit is determined to contain the image pattern, the control unit instructs the data processing unit to replace data to be printed with other data, and instructs the printer unit to print the replaced data.

9. The image forming apparatus according to claim 6, wherein when the image data acquired by the scanner unit is determined to contain the image pattern, the control unit instructs the data processing unit to damage data to be printed, and instructs the printer unit to print the damaged data.

10. An information processing system comprising:
 a portable terminal device; and
 an image forming apparatus, wherein
 the portable terminal device includes:
  a location-information acquiring unit that acquires physical location information about the portable terminal device;
  a first near field communication (NFC) unit that establishes wireless communication with the image forming apparatus by being brought near the image forming apparatus;
  a first short-range communication unit that has a larger wireless communication coverage than a wireless communication coverage of the first NFC unit and establishes wireless communication with the image forming apparatus by using connection setting information received via the first NFC unit;
  a receiving unit that receives, from the image forming apparatus via the first short-range communication unit, function setting information defining whether each setting item of the image forming apparatus is applicable or not, so as to cause the portable terminal device to update setting items, which have been displayed on a printer setting window of the portable terminal device before the first NFC unit establishes the wireless communication with the portable terminal device, such that an unavailable setting item is changed in display; and
  a print control unit that transmits an instruction indicating whether to enable or disable print processing control based on the location information to the image forming apparatus via the first short-range communication unit, and the image forming apparatus includes:
- a second NFC unit that establishes, when the portable terminal device comes near the second NFC unit, wireless communication with the portable terminal device;
- a second short-range communication unit that has a larger wireless communication coverage than a wireless communication coverage of the second NFC unit and that establishes wireless communication with the portable terminal device by using the connection setting information received via the second NFC unit;
- a data processing unit that receives data transmitted from the portable terminal device via the second short-range communication unit, performs data processing on the data;
- a printer unit that prints out the data processed by the data processing unit;
- a transmitting unit that transmits, to the portable terminal device via the second short-range communication unit, the function setting information, so as to cause the portable terminal device to update setting items, which have been displayed on the printer setting window of the portable terminal device before the second NFC unit establishes the wireless communication with the portable terminal device, such that an unavailable setting item is changed in display; and
- a control unit that controls processing performed by at least one of the data processing unit and the printer unit in accordance with the instruction indicating whether to enable or disable print processing control contained in the data received via the second short-range communication unit.

* * * * *